(12) United States Patent
Xin et al.

(10) Patent No.: US 12,439,328 B2
(45) Date of Patent: Oct. 7, 2025

(54) METHOD FOR CORRELATING DATA OF TERMINAL DEVICE AND APPARATUS

(71) Applicant: HUAWEI TECHNOLOGIES CO., LTD., Shenzhen (CN)

(72) Inventors: Yang Xin, Shanghai (CN); Weiwei Chong, Shenzhen (CN); Xiaobo Wu, Shenzhen (CN); Dongrun Qin, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 450 days.

(21) Appl. No.: 18/159,539

(22) Filed: Jan. 25, 2023

(65) Prior Publication Data
US 2023/0171679 A1 Jun. 1, 2023

Related U.S. Application Data

(63) Continuation of application No. PCT/CN2021/107967, filed on Jul. 22, 2021.

(30) Foreign Application Priority Data

Jul. 27, 2020 (CN) .......................... 202010732883.0

(51) Int. Cl.
H04W 48/16 (2009.01)
H04W 8/02 (2009.01)
(52) U.S. Cl.
CPC ............. H04W 48/16 (2013.01); H04W 8/02 (2013.01)
(58) Field of Classification Search
CPC .................................. H04W 48/16; H04W 8/02
See application file for complete search history.

(56) References Cited

U.S. PATENT DOCUMENTS

2017/0344758 A1* 11/2017 Matsuo .................... H04L 9/30
2019/0357301 A1* 11/2019 Li ........................... H04L 45/74
2020/0112868 A1    4/2020 Shariat et al.

FOREIGN PATENT DOCUMENTS

CN        110324170 A  * 10/2019 ............. G06N 20/00
CN        110650034 A     1/2020
(Continued)

OTHER PUBLICATIONS

ETRI et al., "CR to properly separate UE identifiers from Analytics Filter," 3GPP TSG-SA WG2 Meeting #134, Sapporo, Japan, S2-1908081, Total 13 pages, 3rd Generation Partnership Project (Jun. 24-28, 2019).

(Continued)

Primary Examiner — Duc C Ho
(74) Attorney, Agent, or Firm — Leydig, Voit & Mayer, Ltd.

(57) ABSTRACT

A method for correlating data of a terminal device and an apparatus are provided, to correlate data of a single terminal device by a RAN side, and further analyze the data of the terminal device. The method is: A first device obtains first data of a terminal device on a second device, where the first data includes first correlation information, the first correlation information is used to correlate the first data with second data of the terminal device on a first access network device, the second data includes the first correlation information, and there are one or more terminal devices. The first device determines a first identifier of the terminal device, and sends the first correlation information and the first identifier of the terminal device to a second access network device.

19 Claims, 12 Drawing Sheets

(56) References Cited

FOREIGN PATENT DOCUMENTS

| CN | 110677299 A | 1/2020 |
|---|---|---|
| EP | 3783995 A1 | 2/2021 |

OTHER PUBLICATIONS

Nokia et al., "Corrections to data collection from NFs," SA WG2 Meeting #135, Split, Croatia, S2-1909257, Total 13 pages (Oct. 14-18, 2019).

* cited by examiner

METHOD FOR CORRELATING DATA OF TERMINAL DEVICE AND APPARATUS

CROSS-REFERENCE TO RELATED APPLICATIONS

This application a continuation of International Application No. PCT/CN2021/107967, filed on Jul. 22, 2021, which claims priority to Chinese Patent Application No. 202010732883.0, filed on Jul. 27, 2020. The disclosures of the aforementioned applications are hereby incorporated by reference in their entireties.

TECHNICAL FIELD

This disclosure relates to the field of communication technologies, and in particular, to a method for correlating data of a terminal device and an apparatus.

BACKGROUND

A radio access network (radio access network, RAN) needs to analyze data of any terminal device. However, currently, because a RAN side cannot correlate data of a single terminal device, the RAN side cannot analyze the data of the terminal device.

SUMMARY

This disclosure provides a method for correlating data of a terminal device and an apparatus, to correlate data of a single terminal device by a RAN side, and further analyze the data of the terminal device.

According to a first aspect, this disclosure provides a method for correlating data of a terminal device. The method may include: A first device obtains first data of a terminal device on a second device, where the first data includes first correlation information, the first correlation information is used to correlate the first data with second data of the terminal device on a first access network device, and the second data includes the first correlation information. The first device determines a first identifier of the terminal device, and sends the first correlation information and the first identifier of the terminal device to a second access network device. There are one or more terminal devices.

According to the foregoing method, an access network device may correlate data of the terminal device via the first device, so that the access network device can analyze the data of the terminal device.

In an embodiment, the first correlation information may include one or more of the following information: time information, an identifier allocated by the first access network device to the terminal device, an identifier allocated by the second device to the terminal device, an identifier of the first access network device, and an identifier of the second device.

In an embodiment, the first device may further receive a first request from the second access network device, where the first request is used to request the first correlation information and the first identifier of the terminal device.

In an embodiment, the first request may include one or more of the following information: a time window and a network area. In this way, the terminal device may request the first correlation information based on a specific requirement.

In an embodiment, the first device may be a data analysis network element, and the second device may be an access and mobility management function network element.

In an embodiment, the first device may be a data analysis network element, and the second device may be a user plane function network element.

In an embodiment, both the first device and the second device are the terminal device.

In an embodiment, when the first device is a data analysis network element, the second device is an access and mobility management function network element or a user plane function network element, and the first data of the terminal device on the second device further includes a second identifier of the terminal device, a specific method for the first device to determine the first identifier of the terminal device may be: The first device determines the first identifier of the terminal device based on the second identifier of the terminal device. In this way, the first device may generate a temporary identifier (that is, the first identifier) of the terminal device for the terminal device, to hide an actual identifier of the terminal device, and avoid privacy leakage of the terminal device.

In an embodiment, when both the first device and the second device are the terminal device, a specific method for the first device to determine the first identifier of the terminal device may be: The first device sends a second request to a third device, where the second request is used to request the first identifier of the terminal device, and the second request includes a second identifier of the terminal device; and the first device receives the first identifier of the terminal device from the third device. In this way, the first device may accurately obtain a temporary identifier (that is, the first identifier) of the terminal device from the third device, to hide an actual identifier of the terminal device, and avoid privacy leakage of the terminal device.

In an embodiment, when the first device is a data analysis network element, and the second device is an access and mobility management function network element or a user plane function network element, a specific method for the first device to obtain the first data of the terminal device on the second device may be: The first device sends a first message to the second device, where the first message is used to request the first data of the terminal device on the second device; and the first device receives the first data of the terminal device on the second device from the second device. In this way, the first device can accurately obtain the first data, and further accurately obtain the first correlation information.

In an embodiment, the first device receives a third request from a third access network device, where the third request is used to request a first identifier of a target terminal device, the third request includes second correlation information, and the second correlation information is used to correlate third data of the target terminal device on the second device with fourth data of the target terminal device on the first access network device. The first device determines the first identifier of the target terminal device based on the second correlation information. The first device sends the first identifier of the target terminal device to the third access network device.

According to the foregoing method, in a subsequent process in which the third access network device analyzes data of the target terminal device, the third access network device can accurately obtain the first identifier of the target terminal device, and further determine a target model corresponding to the first identifier of the target terminal device, to analyze the data of the target terminal device.

According to a second aspect, this disclosure provides a method for correlating data of a terminal device. The method may include: After receiving first correlation information and a first identifier of a terminal device from a first device, a second access network device determines a model of the terminal device based on the first correlation information. The second access network device sends the model of the terminal device and the first identifier of the terminal device to a third access network device, where the first identifier of the terminal device identifies the model of the terminal device, the first correlation information is used to correlate first data of the terminal device on a second device with second data of the terminal device on a first access network device, the second data includes the first correlation information, there are one or more terminal devices, and the model of the terminal device is used to determine a data analysis result of the terminal device.

According to the foregoing method, an access network device may correlate data of the terminal device via the first device, so that the access network device can analyze the data of the terminal device.

In an embodiment, the first correlation information includes one or more of the following information: time information, an identifier allocated by the first access network device to the terminal device, an identifier allocated by the second device to the terminal device, an identifier of the first access network device, and an identifier of the second device.

In an embodiment, a specific method for the second access network device to determine the model of the terminal device based on the first correlation information may be: The second access network device determines, based on the first correlation information and the second data of the terminal device on the first access network device, training data corresponding to the terminal device, and determines the model of the terminal device based on the training data corresponding to the terminal device. In this way, the second access network device can accurately complete training on the model of the terminal device, so that the third access network device subsequently analyzes data of the terminal device based on the model of the terminal device.

In an embodiment, the training data includes sample data corresponding to at least one group of information, and any group of information includes one or more of the following information: the time information, the identifier allocated by the first access network device to the terminal device, and the identifier of the first access network device.

According to a third aspect, this disclosure provides a method for correlating data of a terminal device. The method may include: A third access network device receives a model of at least one terminal device and a first identifier of the at least one terminal device from a second access network device. The third access network device obtains second correlation information. The third access network device determines a data analysis result of a target terminal device based on the model of the at least one terminal device, the first identifier of the at least one terminal device, and the second correlation information. A first identifier of each terminal device identifies a corresponding model of the terminal device, and the model of each terminal device is used to determine a corresponding data analysis result of the terminal device. The second correlation information is used to correlate third data of the target terminal device on a second device with fourth data of the target terminal device on a first access network device, and the target terminal device is one of the at least one terminal device.

According to the foregoing method, an access network device may correlate data of the terminal device, so that the access network device can analyze the data of the terminal device.

In an embodiment, the third access network device determines policy information of the target terminal device based on the data analysis result of the target terminal device. The third access network device sends the policy information to the first access network device. In this way, the third access network device can accurately determine the policy information of the target terminal device, and notify the first access network device accessed by the terminal device.

In an embodiment, a specific method for the third access network device to determine the data analysis result of the target terminal device based on the model of the at least one terminal device, the first identifier of the at least one terminal device, and the second correlation information may be: The third access network device obtains a first identifier of the target terminal device. The third access network device determines, based on the first identifier of the target terminal device, the model of the at least one terminal device, and the first identifier of the at least one terminal device, a target model corresponding to the first identifier of the target terminal device. The third access network device determines the data analysis result of the target terminal device based on the second correlation information and the target model.

According to the foregoing method, the third access network device can accurately complete data analysis on the target terminal device.

In an embodiment, a specific method for the third access network device to obtain the first identifier of the target terminal device may be: The third access network device sends a third request to a first device, where the third request is used to request the first identifier of the target terminal device, and the third request includes the second correlation information. The third access network device receives the first identifier of the target terminal device from the first device. In this way, the third access network device can accurately obtain the first identifier of the target terminal device, and further accurately determine the target model of the target terminal device, to analyze data of the target terminal device.

In an embodiment, a specific method for the third access network device to determine the data analysis result of the target terminal device based on the second correlation information and the target model may be: The third access network device determines inference data of the target terminal device based on the second correlation information, where the inference data includes the fourth data of the target terminal device on the first access network device. The third access network device determines the data analysis result of the target terminal device based on the inference data of the target terminal device and the target model.

In an embodiment, the second correlation information includes one or more of the following information: time information, an identifier allocated by the first access network device to the terminal device, and an identifier of the first access network device.

According to a fourth aspect, this disclosure further provides a communication apparatus. The communication apparatus may be a first device, and the communication apparatus has a function of implementing the first device in the first aspect or the embodiments of the first aspect. The function may be implemented by hardware, or may be implemented by hardware executing corresponding software. The hardware or software includes one or more modules corresponding to the foregoing function.

In an embodiment, a structure of the communication apparatus may include a transceiver unit and a processing unit. These units may perform a corresponding function of the first device in the first aspect or the embodiments of the first aspect. For details, refer to detailed descriptions of the method examples. Details are not described herein again.

In an embodiment, a structure of the communication apparatus includes a transceiver and a processor, and optionally further includes a memory. The transceiver is configured to receive and send data, and is configured to communicate and interact with another device in a communication system. The processor is configured to support the communication apparatus in performing a corresponding function of the first device in the first aspect or the embodiments of the first aspect. The memory is coupled to the processor, and stores program instructions and data that are necessary for the communication apparatus.

According to a fifth aspect, this disclosure further provides a communication apparatus. The communication apparatus may be a second access network device, and the communication apparatus has a function of implementing the second access network device in the second aspect or the embodiments of the second aspect. The function may be implemented by hardware, or may be implemented by hardware executing corresponding software. The hardware or software includes one or more modules corresponding to the foregoing function.

In an embodiment, a structure of the communication apparatus may include a transceiver unit and a processing unit. These units may perform a corresponding function of the second access network device in the second aspect or the embodiments of the second aspect. For details, refer to detailed descriptions of the method examples. Details are not described herein again.

In an embodiment, a structure of the communication apparatus includes a transceiver and a processor, and optionally further includes a memory. The transceiver is configured to receive and send data, and is configured to communicate and interact with another device in a communication system. The processor is configured to support the communication apparatus in performing a corresponding function of the second access network device in the second aspect or the embodiments of the second aspect. The memory is coupled to the processor, and stores program instructions and data that are necessary for the communication apparatus.

According to a sixth aspect, this disclosure further provides a communication apparatus. The communication apparatus may be a third access network device, and the communication apparatus has a function of implementing the third access network device in the third aspect or the embodiments of the third aspect. The function may be implemented by hardware, or may be implemented by hardware executing corresponding software. The hardware or software includes one or more modules corresponding to the foregoing function.

In an embodiment, a structure of the communication apparatus may include a transceiver unit and a processing unit. These units may perform a corresponding function of the third access network device in the third aspect or the embodiments of the third aspect. For details, refer to detailed descriptions of the method examples. Details are not described herein again.

In an embodiment, a structure of the communication apparatus includes a transceiver and a processor, and optionally further includes a memory. The transceiver is configured to receive and send data, and is configured to communicate and interact with another device in a communication system. The processor is configured to support the communication apparatus in performing a corresponding function of the third access network device in the third aspect or the embodiments of the third aspect. The memory is coupled to the processor, and stores program instructions and data that are necessary for the communication apparatus.

According to a seventh aspect, an embodiment of this disclosure provides a communication system. The communication system may include the first device, the first access network device, the second access network device, the third access network device, and the like mentioned above.

According to an eighth aspect, an embodiment of this disclosure provides a computer-readable storage medium, where the computer-readable storage medium stores program instructions, and when the program instructions are run on a computer, the computer is enabled to perform any one of the first aspect or the possible designs thereof, any one of the second aspect or the possible designs thereof, or any one of the third aspect or the possible designs thereof of embodiments of this disclosure For example, the computer-readable storage medium may be any usable medium that can be accessed by a computer. The following provides an example but does not impose a limitation: The computer-readable medium may include a non-transient computer-readable medium, a random access memory (RAM), a read-only memory (ROM), an electrically erasable programmable read-only memory (electrically EPROM, EEPROM), a CD-ROM or another optical disc storage, a disk storage medium or another magnetic storage device, or any other medium that can be used to carry or store expected program code in an instruction or data structure form and that can be accessed by a computer.

According to a ninth aspect, an embodiment of this disclosure provides a computer program product including computer program code or instructions. When the computer program product runs on a computer, the computer is enabled to implement the method in any one of the first aspect or the possible designs thereof, any one of the second aspect or the possible designs thereof, or any one of the third aspect or the possible designs thereof.

According to a tenth aspect, this disclosure further provides a chip. The chip is coupled to a memory, and is configured to read and execute program instructions stored in the memory, to implement the method in any one of the first aspect or the possible designs thereof, any one of the second aspect or the possible designs thereof, or any one of the third aspect or the possible designs thereof.

For the fourth aspect to the tenth aspect and technical effects that can be achieved in the fourth aspect to the tenth aspect, refer to descriptions of technical effects that can be achieved in the possible solutions in the first aspect, the second aspect, or the third aspect. Details are not described herein again.

DESCRIPTION OF EMBODIMENTS

The following further describes in detail this disclosure with reference to accompanying drawings.

Embodiments of this disclosure provide a method for correlating data of a terminal device and an apparatus, to correlate data of a single terminal device by a RAN side, and further analyze the data of the terminal device. The method and the apparatus of this disclosure are based on a same technical concept. The method and the apparatus have similar principles for resolving problems. Therefore, for implementation of the apparatus and the method, refer to each other. Details of repeated parts are not described.

Figure 1:
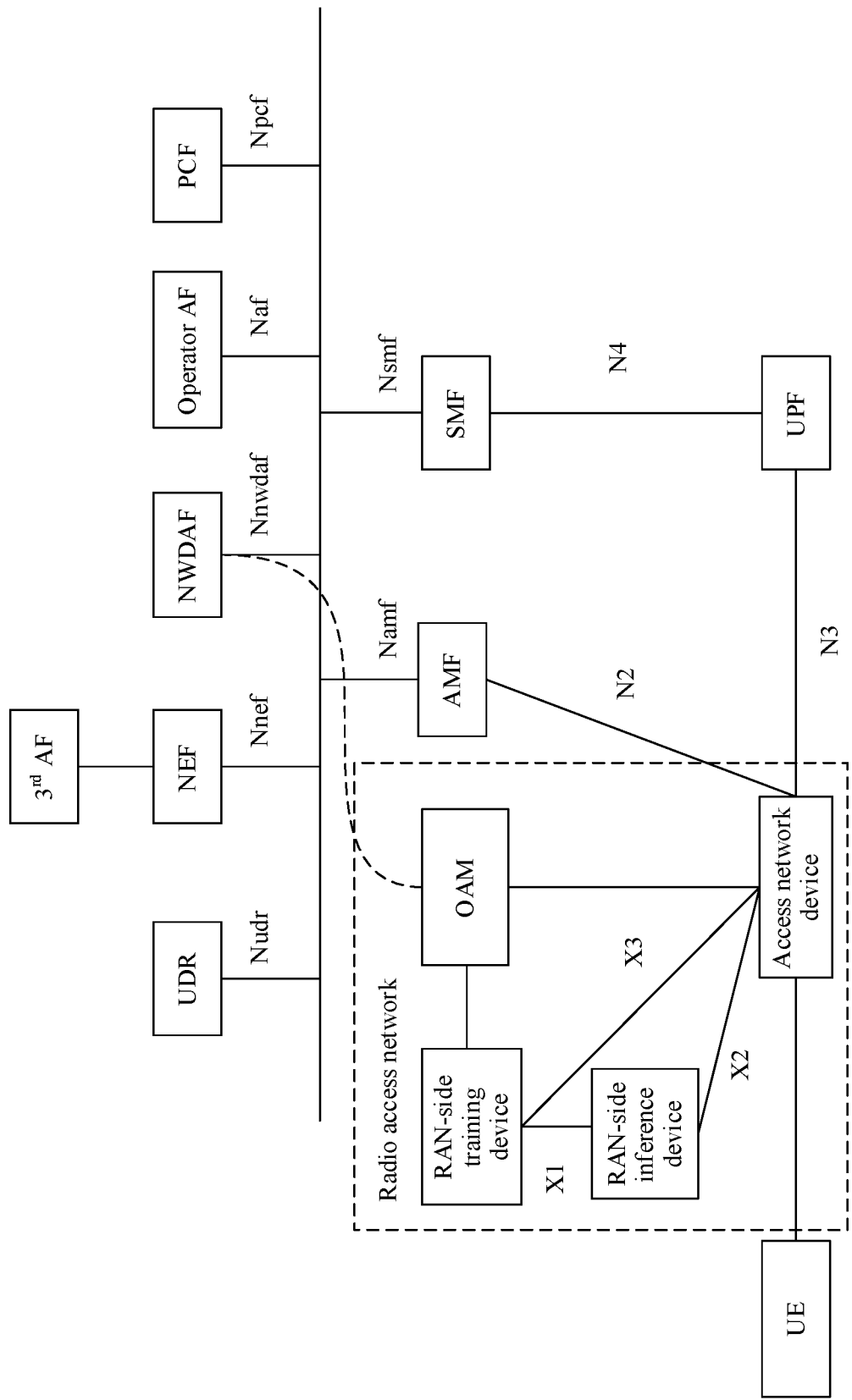
FIG. 1 is a schematic diagram of an architecture of a communication system according to this disclosure.

An architecture of a possible communication system to which the method for correlating data of a terminal device provided in embodiments of this disclosure is applicable may include a radio access network, a terminal device, and a core network. For example, FIG. 1 shows a possible example of an architecture of a communication system. In the architecture of the communication system, a radio access network may include an access network device, a RAN-side inference device (inference function), a RAN-side training device (training function), and an operation, administration and maintenance ( ) network element. A core network may include a network exposure function (NEF) network element, a policy control function (PCF) network element, a unified data repository (UDR) network element, an application function (AF) network element (including a third-party application function ($3^{rd}$ AF) network element, an operator (operator) AF, and the like), an authentication server function (AUSF) network element, an access and mobility management function (AMF) network element, a session management function network element (SMF), a network data analytics function (NWDAF) network element, and a user plane function (UPF) network element. The AMF network element may be connected to the access network device through an N2 interface, the access network device may be connected to the UPF through an N3 interface, the SMF may be connected to the UPF through an N4 interface, the RAN-side inference device may be connected to the RAN-side training device through an X1 interface, the RAN-side inference device may be connected to the access network device through an X2 interface, and the RAN-side training device may be connected to the access network device through an X3 interface. An interface name is merely an example for description. This is not specifically limited in this embodiment of this disclosure. It should be understood that this embodiment of this disclosure is not limited to the communication system shown in FIG. 1. Names of the network elements shown in FIG. 1 are merely used as examples for description herein, and are not used as limitations on the network elements included in the architecture of the communication system to which the method in this disclosure is applicable. The following describes in detail a function of each network element or device in the communication system.

The terminal device may also be referred to as user equipment (UE), a mobile station (MS), a mobile terminal (MT), or the like, and is a device that provides voice and/or data connectivity for a user. For example, the terminal device may include a handheld device having a wireless connection function, a vehicle-mounted device, and the like. Currently, the terminal device may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city (smart city), a wireless terminal in a smart home, or the like. In FIG. 1, the terminal device is shown by using UE as an example, and the terminal device is not limited.

The access network device is a device that connects a terminal device to a wireless network in a communication system. The access network device is a node in the radio access network, and may also be referred to as a base station, or may also be referred to as a radio access network (RAN) node (or device). Currently, for example, the access network device is a gNB, a transmission reception point (transmission reception point, TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (baseband unit, BBU), or a wireless fidelity (Wi-Fi) access point (AP).

The access and mobility management function network element may be configured to manage access control and mobility of the terminal device. In actual application, the access and mobility management function network element includes a mobility management function in a mobility management entity (MME) in a network framework of long term evolution (LTE), and includes an access management function. The access and mobility management function network element may be responsible for registration of the terminal device, mobility management, a tracking area update procedure, reachability detection, selection of a session management function network element, mobility status transition management, and the like. For example, in 5G, the access and mobility management function network element may be an AMF network element, for example, as shown in FIG. 1. In future communication, for example, in 6G, the access and mobility management function network element may still be an AMF network element or have another name. This is not limited in this disclosure. When the access and mobility management function network element is an AMF network element, the AMF may provide a Namf service.

The session management function network element may be responsible for session management (including session establishment, modification, and release) of the terminal device, selection and reselection of a user plane function network element, internet protocol (IP) address allocation of the terminal device, quality of service (QoS) control, and the like. For example, in the 5G, the session management function network element may be an SMF network element, for example, as shown in FIG. 1. In future communication, for example, in the 6G, the session management function network element may still be an SMF network element or have another name. This is not limited in this disclosure.

When the session management function network element is an SMF network element, the SMF may provide an Nsmf service.

The network data analytics network element may be configured to perform big data analytics (for example, in embodiments of this disclosure, a background traffic transmission data analysis result of the terminal device may be obtained through analysis). For example, in the 5G, the network data analytics network element may be an NWDAF network element, for example, as shown in FIG. 1. In future communication, for example, in the 6G, the data analytics network element may still be an NWDAF network element or may have another name. This is not limited in this disclosure. When the network data analytics network element is an NWDAF network element, the NWDAF network element may provide an Nnwdaf service.

The policy control function network element may be responsible for making a policy control decision (for example, may be responsible for making a decision on a background traffic transfer policy in embodiments of this disclosure), providing detection, gating control, and QoS that are based on a service data flow and an application, providing a function of flow-based charging control, and the like. For example, in the 5G, the policy control function network element may be a PCF network element, for example, as shown in FIG. 1. In future communication, for example, in the 6G, the policy control function network element may still be a PCF network element or may have another name. This is not limited in this disclosure. When the policy control function network element is a PCF network element, the PCF network element may provide an Npcf service.

A main function of the application function network element is to interact with a 3rd generation partnership project (3GPP) core network to provide a service, to affect service flow routing, access network capability exposure, policy control, and the like. For example, in the 5G, the application function network element may be an AF network element, or may be a third-party AF ($3^{rd}$ AF) network element or an operator AF network element, where the AF network element may directly interact with the operator network element (for example, an AMF network element, an SMF network element, or a PCF network element), and the $3^{rd}$ AF network element may interact with the operator network element only via a network exposure function network element (for example, an NEF network element), as shown in FIG. 1. In future communication, for example, in the 6G, the application function network element may still be an AF network element, a $3^{rd}$ AF network element, or may have another name. This is not limited in this disclosure. When the application function network element is an AF network element, the AF network element may provide a Naf service.

The unified data repository network element may be configured to store data and the like. For example, in the 5G, the unified data repository network element may be a UDR network element, for example, as shown in FIG. 1. In future communication, for example, in the 6G, the unified data repository network element may still be a UDR network element or may have another name. This is not limited in this disclosure. When the unified data repository network element is a UDR network element, the UDR network element may provide an Nudr service.

The network exposure function network element may be configured to enable 3GPP to securely provide a network service capability for a third-party AF (for example, a service capability server (SCS) or an application server (AS)). For example, in the 5G, the network exposure function network element may be a NEF network element, for example, as shown in FIG. 1. In future communication, for example, in the 6G, the network exposure function network element may still be a NEF network element or have another name. This is not limited in this disclosure. When the network exposure function network element is a NEF, the NEF may provide an Nnef service for another network function network element.

The user plane function network element may be configured to forward user plane data of the terminal device. Main functions of the user plane function network element include data packet routing and forwarding, serving as a mobility anchor and an uplink classifier to route a service flow to a data network and a branch point to support a multi-homed packet data unit (PDU) session, and the like. For example, in the 5G, the user plane function network element may be a UPF network element, for example, as shown in FIG. 1. In future communication, for example, in the 6G, the user plane function network element may still be a UPF network element or have another name. This is not limited in this disclosure.

The OAM network element may be used for network management, including network resource allocation and management, network performance monitoring, network fault detection, diagnosis, and recovery, and the like.

The RAN-side training device is a device that performs model training in a radio access network.

The RAN-side inference device is a device that performs inference based on a model obtained through the training by the RAN-side training device in the radio access network and inference data.

The RAN-side inference device and the RAN-side training device may also be considered as access network devices.

Each of the foregoing network elements in the core network may also be referred to as a function entity or a device, and may be a network element implemented on dedicated hardware, or may be a software instance run on dedicated hardware, or an instance of a virtualization function on a proper platform. For example, the foregoing virtualization platform may be a cloud platform.

It should be noted that the architecture of the communication system shown in FIG. 1 is not limited to including only the network elements shown in the figure, and may further include another device not shown in the figure. Details are not described herein in this disclosure one by one.

It should be noted that a distribution form of the network elements is not limited in embodiments of this disclosure. The distribution form shown in FIG. 1 is merely an example, and is not limited in this disclosure.

For ease of description, subsequently the network elements shown in FIG. 1 are used as examples for description in this disclosure, and an XX network element is directly referred to as XX. It should be understood that names of all network elements in this disclosure are merely used as examples, and may also be referred to as other names in future communication, or the network element in this disclosure may be replaced by another entity or device that has a same function in future communication. This is not limited in this disclosure. Unified descriptions are provided herein, and details are not described below again.

It should be noted that the communication system shown in FIG. 1 does not constitute a limitation on a communication system to which embodiments of this disclosure are applicable. The architecture of the communication system shown in FIG. 1 is a 5G system architecture. Optionally, the method in embodiments of this disclosure is further applicable to various future communication systems, such as 6G or another communication network.

Embodiments of this disclosure are mainly specific for a scenario in which a RAN side performs per terminal device (per UE) data analysis, for example:

Scenario 1: An access network device may perform per UE transmission control (traffic steering) or mobility management (mobility management), that is, each UE has a separate machine learning model.

Scenario 2: An access network device side performs service management operating system (MOS) model training. For example, training data includes 10 million samples, and only 100,000 UEs provide the training data. Data of single UE may be extracted through data correlation, to implement deduplication, data dimension reduction, or the like.

Scenario 3: In an inference phase, an access network device may predict behavior data of UE on a future access network device based on historical data of the UE, to assist the access network device in making decisions such as handover and radio resource control (RRC) reestablishment.

Currently, for data analysis of each terminal device by a RAN side, the RAN side needs to perceive data of a single terminal device. However, if privacy data of the terminal device is involved, the RAN side cannot perceive an identifier (ID) (for example, a subscription permanent identifier (SUPI) or an international mobile equipment identity (IMEI)) of the terminal device. The terminal device has a process from registration to deregistration and from RRC activation to deactivation. In this process, an access network device accessed by the terminal device changes. However, the RAN side cannot perceive that the change is for a same terminal device. Therefore, the RAN side cannot correlate data of each terminal device, and consequently cannot analyze data of the terminal device. Based on this, this disclosure provides a method for correlating data of a terminal device, to correlate data of a single terminal device by a RAN side, and further analyze the data of the terminal device.

It should be noted that, in descriptions of this disclosure, terms such as "first" and "second" are only used for a purpose of distinction in description, but should not be understood as an indication or implication of relative importance or an indication or implication of a sequence. In the descriptions of this disclosure, "at least one (type)" means one (type) or more (types), and "a plurality of (types)" means two (types) or more (types).

To describe technical solutions of embodiments of this disclosure more clearly, the following describes in detail, with reference to the accompanying drawings, the method for correlating data of a terminal device and the apparatus that are provided in embodiments of this disclosure.

Figure 2:
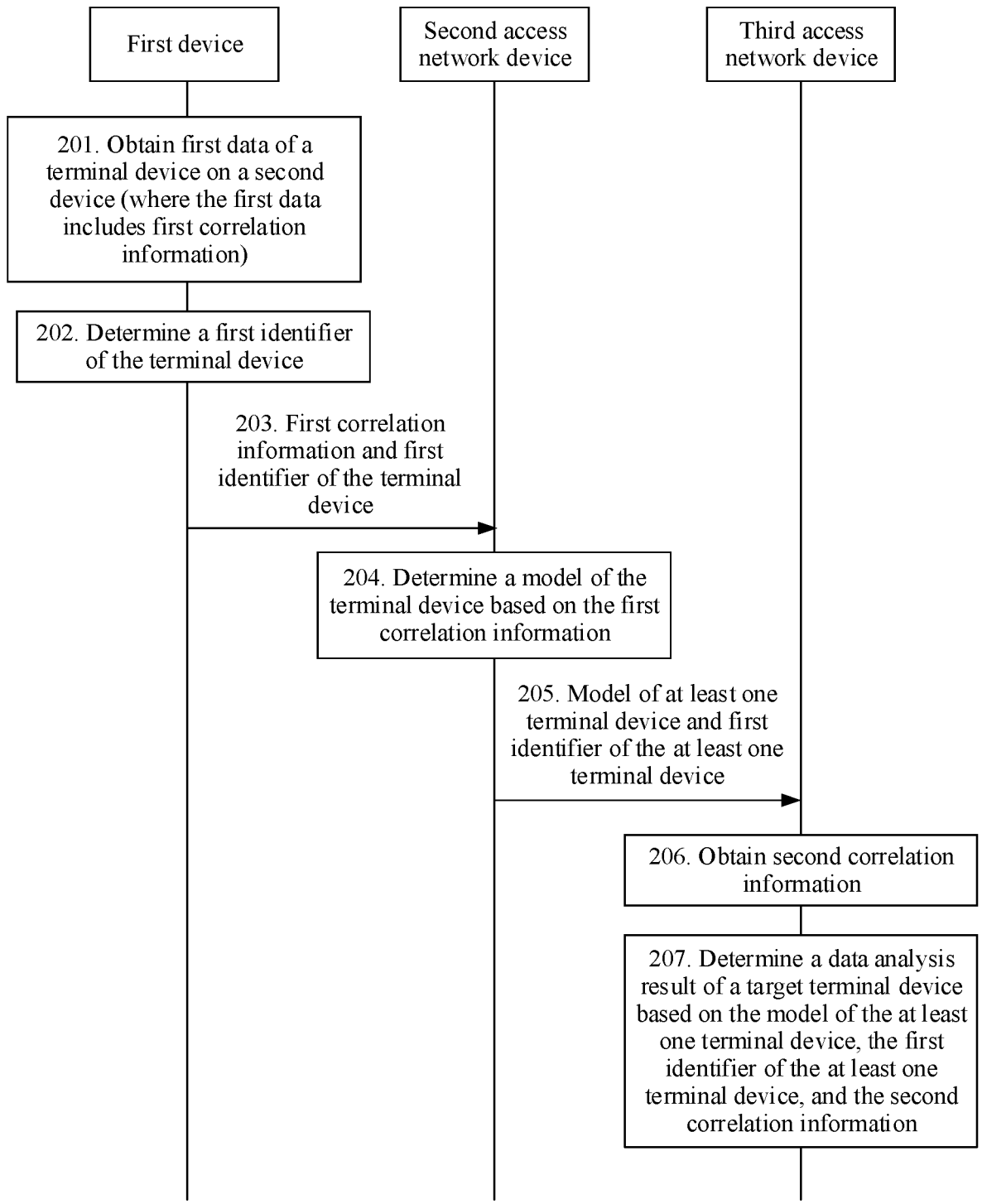
FIG. 2 is a flowchart of a method for correlating data of a terminal device according to this disclosure.

A method for correlating data of a terminal device provided in an embodiment of this disclosure may be applied to the communication system shown in FIG. 1. Refer to FIG. 2. A specific procedure of the method may include the following steps.

Step 201. A first device obtains first data of a terminal device on a second device, where the first data includes first correlation information, the first correlation information is used to correlate the first data with second data of the terminal device on a first access network device, the second data includes the first correlation information, and there are one or more terminal devices.

For example, there are one or more pieces of first correlation information corresponding to a same terminal device.

In an embodiment, in different scenarios, the first device and the second device may have the following three cases:

Case a1: The first device is a data analysis network element, for example, an NWDAF, and the second device is an access and mobility management function network element, for example, an AMF.

Case a2: The first device is a data analysis network element, and the second device is a user plane function network element, for example, a UPF.

Case a3: The first device and the second device are the terminal device, for example, UE.

In an embodiment, the first correlation information may include one or more of the following information: time information, an identifier allocated by the first access network device to the terminal device, an identifier allocated by the second device to the terminal device, an identifier of the first access network device, and an identifier of the second device. The time information is time at which the first data is generated, and the time information may also be referred to as a timestamp (Timestamp x) or a time period (Time Window x or Time Interval x).

For example, in the foregoing case a1, the identifier allocated by the first access network device to the terminal device may be an identifier allocated by the first access network device to the terminal device on an NG interface, for example, a RAN UE next generation application protocol (NGAP) ID, such as RAN UE NGAP ID x. The identifier allocated by the second device to the terminal device may be an AMF UE NGAP ID, such as AMF UE NGAP ID x. The identifier of the first access network device may be a globally unique identifier (Global RAN Node ID) of a RAN, such as Global RAN Node ID x. Alternatively, the identifier allocated by the second device to the terminal device may be a globally unique AMF ID (globally unique AMF identifier, GUAMI).

In the foregoing case a2, the identifier allocated by the first access network device to the terminal device may be tunnel information (AN tunnel Info) allocated by the first access network device to a session of the terminal device on an N3 interface, for example, AN tunnel Info x. The identifier allocated by the second device to the terminal device may be tunnel information (CN tunnel Info) allocated by the second device to the session of the terminal device on the N3 interface, for example, CN tunnel Info x.

In the case a3, the identifier allocated by the first access device to the terminal device may be a cell radio network temporary identifier (C-RNTI). The identifier of the first access network device may be a Global RAN Node ID, for example, Global RAN Node ID x.

For example, the first access network device may be but is not limited to a base station (gNB, RAN-CU, or RAN-DU).

In an embodiment, before the first device obtains the first data of the terminal device on the second device, the first device receives a first request from a second access network device, where the first request is used to request the first correlation information and a first identifier of the terminal device, and the first request includes one or more of the following information: a time window (time window) and a network area (network area). The time window may be a preset time period, and the network area may include a cell, a cell list, a tracking area (tracking area, TA), a TA list, a physical area (for example, a global positioning system (global positioning system, GPS) list), or the like.

For example, an identifier of the terminal device in this embodiment of this disclosure may be one or more of the following: an internet protocol (IP) address, a subscription permanent identifier (SUPI), a permanent equipment identifier (PEI), a generic public subscription identifier (GPSI), an international mobile subscriber identity (IMSI), an international mobile equipment identity (IMEI), an IP address, and a mobile subscriber integrated services digital network number (MSISDN number). For an identifier of a terminal device in the following embodiments, refer to the descriptions herein. Details are not described subsequently again.

For example, area information of the terminal device in this embodiment of this disclosure may be one or more of the following information about an area in which the terminal device is located: a tracking area identifier (tracking area identifier, TAI), a list of tracking area identifiers (list of TAI(s)), a routing area identifier (routing area identifier, RAI), a list of routing area identifiers (list of RAI(s)), a cell identifier (Cell ID), a list of cell identifiers (list of Cell ID(s)), a geographic area identifier (geographical area identifier), a network code (NC), a country code (CC), a city code, and a county code. For area information of a terminal in the following embodiments, refer to the descriptions herein. Details are not described subsequently again.

For example, the second access network device may be a RAN-side training device.

In an embodiment, in the foregoing cases a1 and a2, the first request may be an analytics subscription message (Nnwdaf_AnalyticsSubscription_Subscribe); and in the foregoing case a3, the first request may be a correlation information request.

In an embodiment, in the foregoing cases a1 and a2, that a first device obtains first data of a terminal device on a second device may be specifically: The first device sends a first message to the second device, where the first message is used to request the first data of the terminal device on the second device. The first device receives the first data of the terminal device on the second device from the second device. In the foregoing case a1, the first message may be an AMF event exposure subscription message (Namf_EventExposure_Subscribe), and the first device receives the first data from the second device by using an AMF event exposure notification message (Namf_EventExposure_Notify). In the case a2, the first message may be a UPF event exposure subscription message (Nupf_EventExposure_Subscribe), and the first device may receive the first data from the second device by using a UPF event exposure notification message (Nupf_EventExposure_Subscribe).

In an embodiment, in the foregoing case a2, the first device may further send a second message to an SMF, where the second message is used to request data of the terminal device on the SMF, and the data of the terminal device on the SMF includes correlation information. The correlation information is used to correlate the first data of the terminal device on the second device with the data of the terminal device on the SMF. The first device receives the data of the terminal device on the SMF from the SMF. The second message may be an SMF event exposure subscription message (Nsmf_EventExposure_Subscribe), and the first device may receive the data of the terminal device on the SMF from the SMF by using an SMF event exposure notification message (Nsmf_EventExposure_notify).

It should be noted that, in the foregoing case a1, if the network area includes a plurality of AMFs, the NWDAF needs to obtain the first data from each of the plurality of AMFs, that is, perform a plurality of the foregoing processes of obtaining the first data. In this case, the NWDAF may request addresses of the plurality of AMFs in the network area from an NRF, or the NWDAF may obtain preconfigured addresses of the AMFs.

In an embodiment, in the foregoing case a3, a specific method for the first device to obtain the first data of the terminal device on the second device may be: The first device obtains the locally stored first data.

Step 202. The first device determines the first identifier of the terminal device.

For example, the first identifier of the terminal device is a temporary terminal device identifier (Temporary UE ID).

In an embodiment, in the foregoing case a1 or a2, a specific method for the first device to determine the first identifier of the terminal device may be: The first data of the terminal device on the second device further includes a second identifier of the terminal device. The first device generates or allocates the first identifier of the terminal device to the terminal device based on the second identifier of the terminal device. The second identifier of the terminal device may be one or more of an SUPI, an IMSI, a PEI, an IMEI, a GPSI and an IP address.

In another embodiment, in the foregoing case a3, a specific method for the first device to determine the first identifier of the terminal device may be: The terminal device sends a second request to a third device, where the second request is used to request the first identifier of the terminal device generated or allocated by the third device to the terminal device, and the second request includes a second identifier of the terminal device. The first device receives the first identifier of the terminal device from the third device. The third device may be an application function network element, for example, an AF.

Step 203. The first device sends the first correlation information and the first identifier of the terminal device to the second access network device.

In an embodiment, there may be one or more pieces of first correlation information of the terminal device.

For example, in the foregoing case a1, in step 203, the first device may send the first correlation information and the first identifier of the terminal device in the following form: Temporary UE ID X, List of <Timestamp, RAN UE NGAP ID, Global RAN Node ID> X, where X=1, 2, 3, . . . , N; in the foregoing case a2, the first device may send the first correlation information and the first identifier of the terminal device in the following form: (Temporary UE ID X, List of <Timestamp, AN Tunnel Info> X, where X=1, 2, 3, . . . , N); and in the foregoing case a3, the first device may send Temporary UE ID X and a corresponding correlation information (Timestamp x1, C-RNTI x1, and Global RAN Node ID x1) list.

It should be noted that, because the first identifier of the terminal device is a temporary terminal device identifier, after obtaining the first identifier, the second access network device cannot perceive a specific terminal device for which the first correlation information is specific. Because the temporary terminal device identifier is not equivalent to a unique identifier of the terminal device such as the SUPI or the IMEI, and is temporarily allocated by the first device or temporarily allocated by the third device, the terminal device cannot be uniquely determined by using the temporary terminal device identifier.

Step 204. The second access network device determines a model of the terminal device based on the first correlation information.

The model of the terminal device is used to analyze data of the terminal device, in other words, the model of the terminal device is used to determine a data analysis result of the terminal device. Specifically, a data model of the terminal device may analyze the data of the terminal device based on inference data of the terminal device to obtain the data analysis result of the terminal device. A phase of obtaining the data analysis result of the terminal device may be in an inference phase.

For example, before the second access network device performs step 204, the second access network device may obtain the second data of the terminal device on the first access network device from the first access network device.

In an embodiment, a specific method for the second access network device to determine the model of the terminal device based on the first correlation information may be: The second access network device determines, based on the first correlation information and the second data of the terminal device on the first access network device, training data corresponding to the terminal device. The second access network device determines the model based on the training data corresponding to the terminal device.

For example, that the second access network device determines, based on the first correlation information and the second data of the terminal device on the first access network device, training data corresponding to the terminal device may be specifically: The second access device determines, from the second data based on the first correlation information, the training data corresponding to the terminal device.

In an embodiment, the training data includes sample data corresponding to at least one group of information, and any group of information includes one or more of the following information: the time information, the identifier allocated by the first access network device to the terminal device, and the identifier of the first access network device.

It should be noted that the model of the terminal device may be a data analysis model, a machine learning model, or the like. This is not limited in this disclosure.

Step 205. The second access network device sends the model and the first identifier of the terminal device to a third access network device, where the first identifier of the terminal device identifies the model of the terminal device. Specifically, the third access network device may receive a model of at least one terminal device and a corresponding first identifier of the at least one terminal device from the second access network device, and a first identifier of each terminal device identifies a corresponding model of the terminal device.

For example, the second access network device identifies, by using the first identifier of the terminal device, the model (also referred to as a trained model (Trained Model) or a machine learning model (Machine Learning Model)) corresponding to the terminal device. That is, one Temporary UE ID corresponds to one trained model or machine learning model.

In an embodiment, after receiving the model of the at least one terminal device, the third access network device locally deploys and stores the model of the at least one terminal device, so that the first device subsequently queries for a model corresponding to a target terminal device, to analyze data of the target terminal device. The target terminal device is one of the at least one terminal device.

For example, the third access network device may be a RAN-side inference device.

Step 206. The third access network device obtains second correlation information, where the second correlation information is used to correlate third data of the target terminal device on the second device with fourth data of the target terminal device on the first access network device.

For example, the second correlation information may include one or more of the following information: the time information, the identifier allocated by the first access network device to the terminal device, the identifier allocated by the second device to the terminal device, the identifier of the first access network device, and the identifier of the second device.

In an embodiment, a type (for example, a data type) of each piece of information in the second correlation information is the same as that of each piece of information in the first correlation information, but values are different. For example, the time information is different.

In an embodiment, the third access network device first obtains the fourth data from the first access network device, and then determines the second correlation information based on the fourth data.

It should be noted that the third data and/or the fourth data may be understood as the inference data.

Step 207. The third access network device determines a data analysis result of the target terminal device based on the model of the at least one terminal device, the first identifier of the at least one terminal device, and the second correlation information.

For example, a method for the third access network device to perform step 207 may be: The third access network device obtains a first identifier of the target terminal device. Then, the third access network device determines, based on the first identifier of the target terminal device, the model of the at least one terminal device, and the first identifier of the at least one terminal device, a target model corresponding to the first identifier of the target terminal device. Finally, the third access network device determines the data analysis result of the target terminal device based on the second correlation information and the target model.

A process in which the third access network device determines, based on the first identifier of the target terminal device, the model of the at least one terminal device, and the first identifier of the at least one terminal device, the target model corresponding to the first identifier of the target terminal device is a process in which the third access network device searches for the target model based on the first identifier of the target terminal device and from the model of the at least one terminal device that is locally stored in the third access network device.

In an embodiment, a specific method for the third access network device to obtain the first identifier of the target terminal device may be: The third access network device sends a third request to the first device, where the third request is used to request the first identifier of the target terminal device, and the third request includes the second correlation information. The third access network device receives the first identifier of the target terminal device from the first device. After receiving the third request, the first device determines the first identifier of the target terminal device based on the second correlation information.

In an embodiment, a specific method for the third access network device to determine the data analysis result of the target terminal device based on the second correlation information and the target model may be: The third access network device determines inference data of the target terminal device based on the second correlation information, where the inference data includes the fourth data of the target terminal device on the first access network device. The third access network device determines the data analysis result of the target terminal device based on the inference data of the target terminal device and the target model. The target terminal device is a terminal device in the inference phase.

In an embodiment, the third access network device determines policy information of the target terminal device based on the data analysis result of the target terminal device, and sends the policy information to the first access network device.

According to the method for correlating data of a terminal device provided in this embodiment of this disclosure, an access network device may correlate data of the terminal device via the first device, so that the access network device can analyze the data of the terminal device.

Based on the foregoing embodiment, the following describes, in detail by using specific examples shown in FIG. 3A and FIG. 3B to FIG. 5A and FIG. 5B, a method for correlating data of a terminal device provided in this disclosure. In the following examples, an example in which a terminal device is UE, a first access network device is a base station, a second access network device is a RAN-side training device, and a third access network device is a RAN-side inference device is used for description.

Figure 3A:
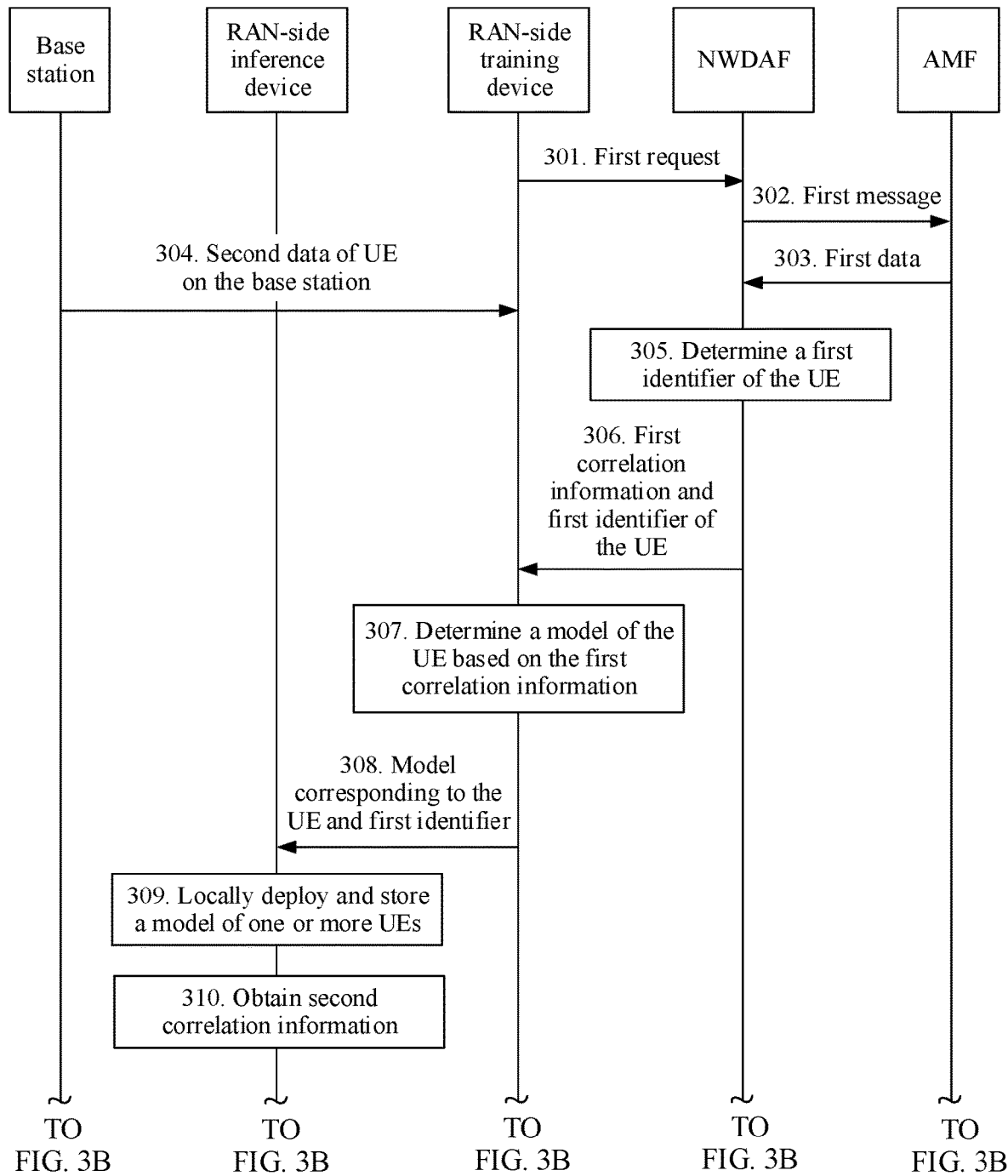
FIG. 3A and FIG. 3B are a flowchart of an example of a method for correlating data of a terminal device according to this disclosure.
Figure 3B:
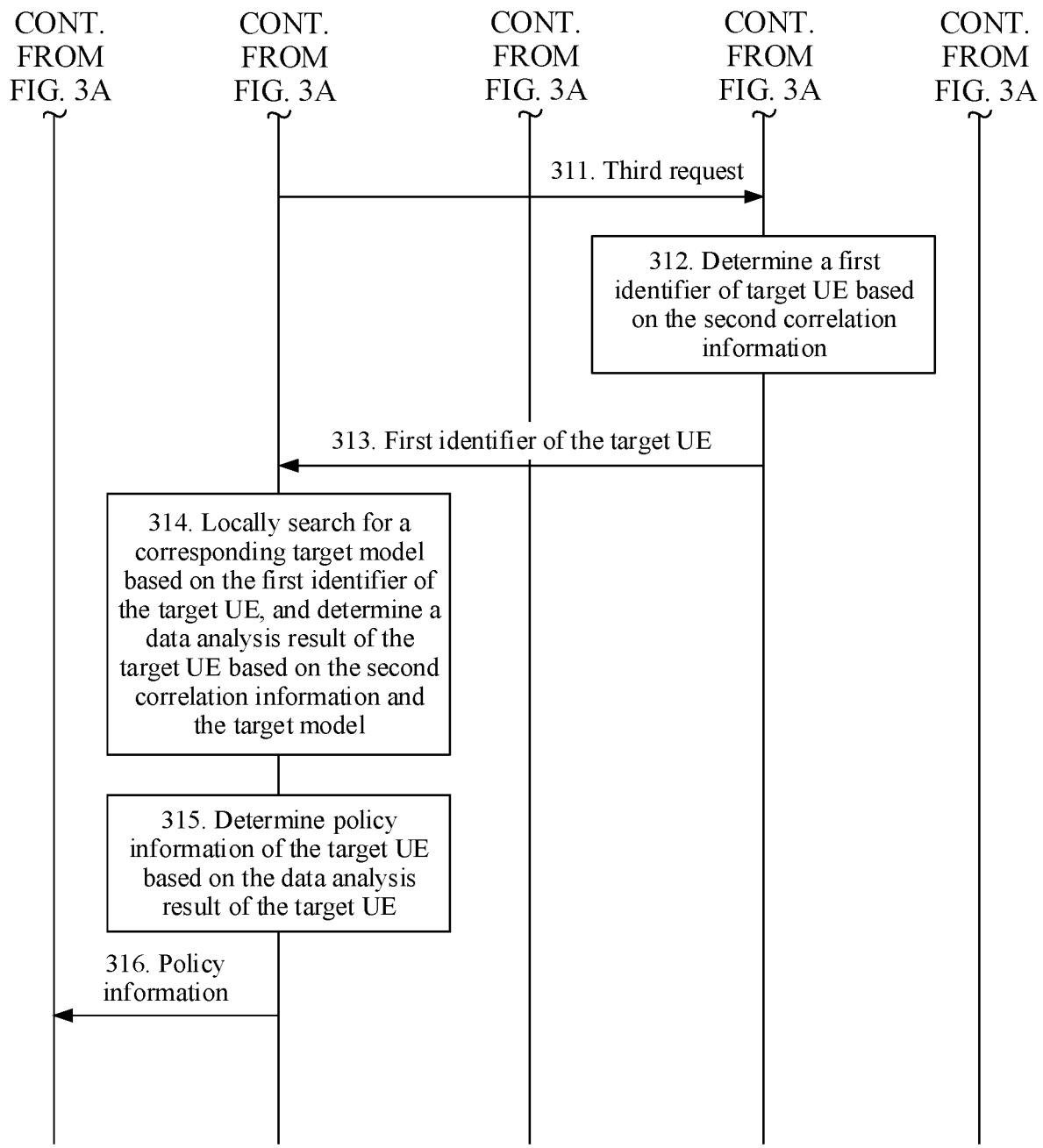

As shown in FIG. 3A and FIG. 3B, an embodiment of this disclosure provides an example of a method for correlating data of a terminal device. In this example, an example in which a first device is an NWDAF and a second device is an AMF is used for description. A specific procedure of the example may include the following steps.

Step 301. A RAN-side training device sends a first request to the NWDAF, where the first request is used to request first correlation information and a first identifier of UE, and the first request includes one or more of the following information: a time window (time window) and a network area (network area).

Specifically, the RAN-side training device requests correlation information that is of each UE in one or more UEs that accesses a base station in a network area in the time window and that is between the AMF and the base station, and a first identifier corresponding to the UE. The first correlation information is used to correlate first data of the UE on the AMF with second data of the UE on the base station.

For example, the RAN-side training device may send the first request to the NWDAF by using Nnwdaf_AnalyticsSubscription_Subscribe.

For example, there may be one or more UEs.

For example, there may be one or more pieces of first correlation information of same UE.

Step 302. The NWDAF sends a first message to the AMF, where the first message is used to request the first data of the one or more UEs on the AMF.

For example, the first data includes one or more pieces of first correlation information.

For example, the NWDAF may send the first message to the AMF by using Namf_EventExposure_Subscribe.

For example, the first correlation information may include one or more of the following information: an identifier (SUPI x) of a terminal device, a timestamp (Timestamp x), an identifier (RAN UE NGAP ID x) allocated by a RAN to the terminal device on an NG interface, and a globally unique identifier (Global RAN Node ID x) of the RAN.

Step 303. The AMF sends, to the NWDAF, the first data including the first correlation information.

It should be noted that, if the network area in step 301 includes a plurality of AMFs, the NWDAF needs to interact with each AMF in step 302 and step 303. In this case, the NWDAF may request addresses of the plurality of AMFs in the network area from a network repository function (network repository function, NRF) network element based on the network area in step 301.

For example, the AMF may send the first data to the NWDAF by using Namf_EventExposure_Notify.

Step 304. The RAN-side training device obtains second data of the UE on the base station from the base station through an X3 interface, where the second data includes the one or more pieces of first correlation information.

The base station is a gNB/RAN device serving the UE, and there is an NG/N2 interface between the base station and the AMF.

For example, the first correlation information that can be perceived by the base station may include Timestamp x, RAN UE NGAP ID x, and Global RAN Node ID x.

It should be noted that the base station cannot perceive a unique identifier of the terminal device, such as an SUPI, an IMEI, or a GPSI.

Step 305. The NWDAF determines the first identifier of the UE.

For example, the NWDAF may learn of, based on the first data obtained in step 303, respective correlation information of each UE in the one or more UEs that accesses the base station in the network area in the time window. The first data includes the SUPI of the UE, and the NWDAF may allocate one Temporary UE ID (that is, the first identifier) to SUPI x of each UE. Through this step, Temporary UE ID is equivalent to anonymizing SUPI x, but Temporary UE ID can uniquely correspond to SUPI x. In this way, it is convenient for a RAN side to subsequently perform per (per) UE data analysis for SUPI x, but the RAN side cannot perceive which terminal device the UE specifically is.

The respective first correlation information of each UE in the one or more UEs that is determined by the NWDAF may be as follows:

Temporary UE ID 1, List of <Timestamp, RAN UE NGAP ID, Global RAN Node ID> 1;
Temporary UE ID 2, List of <Timestamp, RAN UE NGAP ID, Global RAN Node ID> 2;
. . . ; and
Temporary UE ID N, List of <Timestamp, RAN UE NGAP ID, Global RAN Node ID> N, where N is a quantity of UEs, and N is greater than or equal to 1.

Step 306. The NWDAF sends the first correlation information and the first identifier of the UE to the RAN-side training device.

For example, the NWDAF sends Temporary UE ID X, List of <Timestamp, RAN UE NGAP ID, Global RAN Node ID> X to the RAN-side training device, where X=1, 2, 3, . . . , N.

For example, the NWDAF may send the first correlation information and the first identifier of the UE to the RAN-side training device by using Nnwdaf_AnalyticsSubscription_Notify.

Step 307. The RAN-side training device determines a model of the UE based on the first correlation information.

A process of step 307 is a model training process. Specifically, the RAN-side training device determines, based on the respective first correlation information, that is, Temporary UE ID X, List of <Timestamp, RAN UE NGAP ID, Global RAN Node ID> X, of each UE in the one or more UEs, and the second data corresponding to Timestamp x, RAN UE NGAP ID x, and Global RAN Node ID x in step 304, training data corresponding to each UE in the one or more UEs, where X=1, 2, 3, . . . , N. Each piece of training data belongs to one UE, and the training data may include sample data corresponding to one or more groups of information (Timestamp x, RAN UE NGAP ID x, and Global RAN Node ID x).

Then, the RAN-side training device trains a corresponding model (Trained Model) based on the training data of each UE in the one or more UEs. The model is identified by using a Temporary UE ID. A format may be as follows:

Temporary UE ID 1, Trained Model 1;
Temporary UE ID 2, Trained Model 2;
. . . ; and
Temporary UE ID N, Trained Model N, where N is a quantity of UEs.

Step 308. The RAN-side training device sends the model corresponding to each UE in the one or more UEs and the corresponding first identifier to a RAN-side inference device, where a first identifier of UE identifies a model of the UE.

Step 309. The RAN-side inference device locally deploys and stores the model of the one or more UEs.

For model deployment, refer to a method in a conventional technology. Details are not described in this disclosure.

Step 310. The RAN-side inference device obtains second correlation information, where the second correlation information is used to correlate third data of target UE on the AMF with fourth data of the target UE on the base station.

The target UE is one of the one or more UEs.

For example, the RAN-side inference device may first obtain the fourth data of the target UE on the base station, and then obtain the second correlation information from the fourth data.

For example, the fourth data may be understood as inference data.

For example, the second correlation information may be Timestamp y, RAN UE NGAP ID y, and Global RAN Node ID y.

Step 311. The RAN-side inference device sends a third request to the NWDAF, where the third request is used to request a first identifier of the target UE, and the third request includes the second correlation information.

In other words, the RAN-side inference device queries the NWDAF for the corresponding first identifier, that is, Temporary UE ID Y, of the target UE based on the second correlation information.

Step 312. The NWDAF determines (searches for) the first identifier of the target UE based on the second correlation information.

Step 313. The NWDAF sends the first identifier of the target UE to the RAN-side inference device.

It should be noted that, in processes of steps 311 to 313, the NWDAF needs to continuously obtain, from the AMF, Timestamp y, RAN UE NGAP ID y, and SUPI y corresponding to Global RAN Node ID y, and then determine Temporary UE ID Y.

Step 314. The RAN-side inference device locally searches for a corresponding target model based on the first identifier (Temporary UE ID Y) of the target UE, and determines a data analysis result of the target UE based on the second correlation information and the target model.

For example, the RAN-side inference device inputs, into the target model, the inference data (that is, the fourth data) corresponding to Timestamp y, RAN UE NGAP ID y, and Global RAN Node ID y (that is, the second correlation information), to obtain the data analysis result.

Step 315. The RAN-side inference device determines policy information of the target UE based on the data analysis result of the target UE.

Step 316. The RAN-side inference device sends the policy information to the base station.

Based on the foregoing example, the RAN side may perform per UE data correlation via a core network, and the per UE data correlation may assist the RAN side in performing per UE data analysis.

In an embodiment, that the NWDAF determines correlation information of same UE (an SUPI) used when the UE accesses different base stations in steps 302 to 305 may be replaced by the following method: The NWDAF collects data of the UE on the RAN, where the data includes correlation identifier information, that is, Timestamp x, RAN UE NGAP ID x (or AMF UE NGAP ID X), and Global RAN Node ID x, of the UE on the RAN. The NWDAF collects data of the UE on the AMF, where the data includes the correlation identifier information of the UE on the AMF and a UE ID (for example, the SUPI). The NWDAF correlates information of the UE on all base stations to which the UE accesses and on a core network (that is, the RAN and the AMF), to obtain the correlation information, that is, a <Timestamp, RAN UE NGAP ID, Global RAN Node ID> list, of the UE used when the UE accesses the different base stations. The NWDAF allocates a temporary terminal identifier to the correlation information of the UE used when the UE accesses different base stations.

Figure 4A:
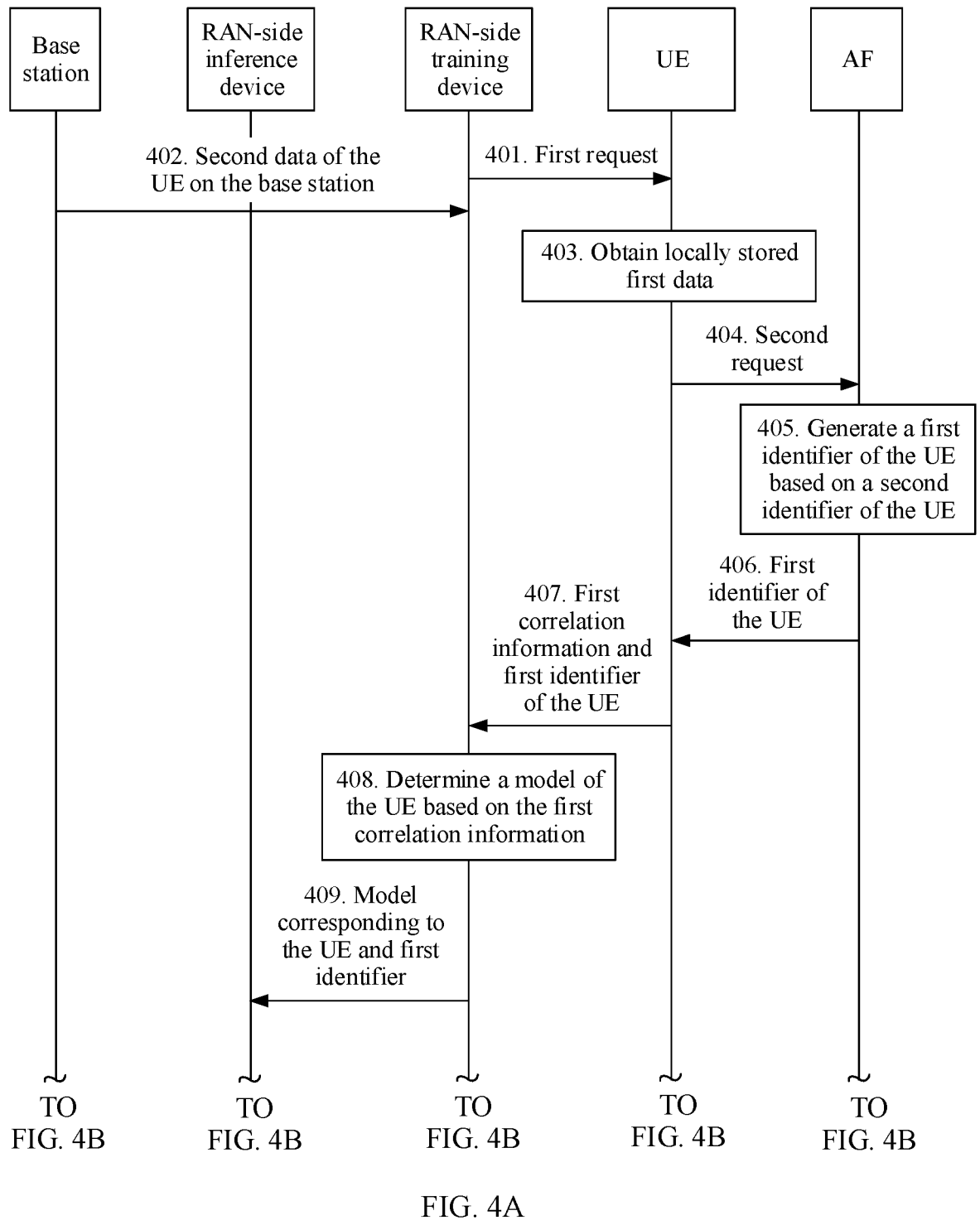
FIG. 4A and FIG. 4B are a flowchart of an example of another method for correlating data of a terminal device according to this disclosure.
Figure 4B:
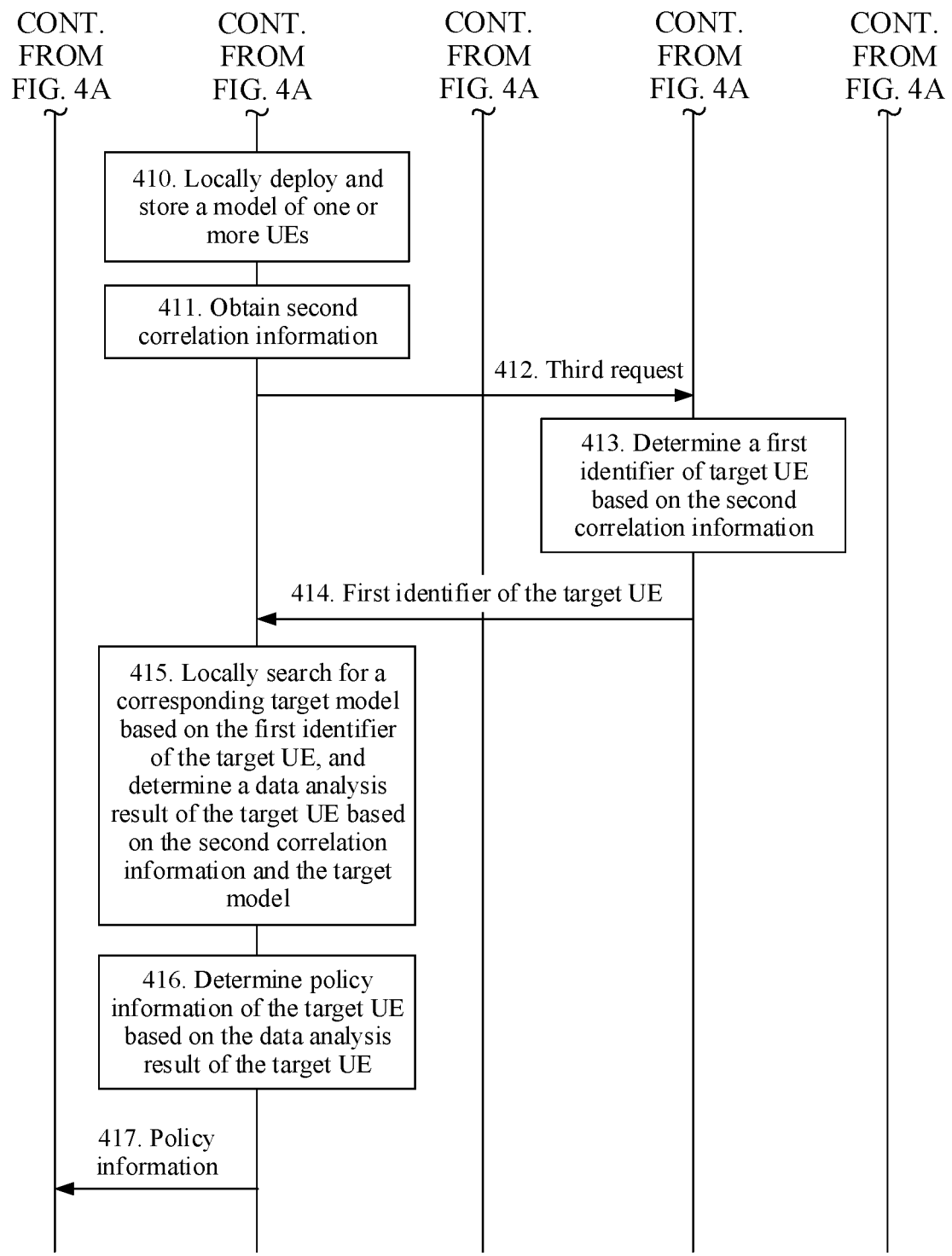

As shown in FIG. 4A and FIG. 4B, an embodiment of this disclosure provides an example of a method for correlating data of a terminal device. In this example, an example in which a first device is UE and a second device is UE is used for description. A specific procedure of the example may include the following steps.

Step 401. A RAN-side training device sends a first request to the UE, where the first request is used to request first correlation information and a first identifier of the UE, and the first request includes one or more of the following information: a time window (time window) and a network area (network area).

The first correlation information is used to correlate first data of the UE on the UE with second data of the UE on the base station.

For example, there may be one or more pieces of first correlation information.

For example, the RAN-side training device requests, from the UE, the first correlation information that is of the UE that accesses the base station in a network area in the time window and that is between the base station and the UE.

Step 402. The RAN-side training device obtains second data of the UE on the base station from the base station through an X3 interface, where the second data includes one or more pieces of first correlation information.

The base station is a gNB/RAN device serving the UE, and there is a Uu interface between the base station and the UE.

The one or more pieces of first correlation information that can be perceived by the base station may include Timestamp x1, C-RNTI x1, and Global RAN Node ID x1.

Step 403. The UE obtains the locally stored first data.

Specifically, the UE stores the one or more pieces of first correlation information (Timestamp x1, C-RNTI x1, and Global RAN Node ID x1) on all base stations in an access network area in the time window.

Step 404. The UE sends a second request to a third device, where the second request is used to request the first identifier of the UE that is generated or allocated by the third device to the UE, and the second request includes a second identifier, that is, SUPI X, of the UE.

The third device may be an AF or a specific server.

Step 405. The third device generates the first identifier (Temporary UE ID X) of the UE based on the second identifier (SUPI X) of the UE.

Step 406. The third device sends the first identifier of the UE to the UE.

Step 407. The UE sends the first correlation information and the first identifier of the UE to the RAN-side training device.

For example, the UE sends Temporary UE ID X and a corresponding correlation information (Timestamp x1, C-RNTI x1, and Global RAN Node ID x1) list to the RAN-side training device.

Step 408. The RAN-side training device determines a model of the UE based on the first correlation information.

A process of step 408 is a model training process. Specifically, the RAN-side training device determines, based on Temporary UE ID X, the corresponding correlation information (Timestamp x1, C-RNTI x1, and Global RAN Node ID x1) list (that is, the one or more pieces of first correlation information) that are from the UE, and the second data corresponding to the one or more pieces of correlation information (Timestamp x, C-RNTI x, and Global RAN Node ID x) in step 402, training data corresponding to the UE. Each piece of training data may include sample data corresponding to one or more groups of information (Timestamp x1, C-RNTI x1, and Global RAN Node ID x1).

Then, the RAN-side training device trains a corresponding model (Trained Model X) based on the training data of the UE. The model may be identified by using Temporary UE ID X. A format may be as follows:

Temporary UE ID X, Trained Model X.

Step 409. The RAN-side training device sends the model corresponding to each UE in one or more UEs and the corresponding first identifier to a RAN-side inference device, where a first identifier of UE identifies a model of the UE.

Step 410. The RAN-side inference device locally deploys and stores the model of the one or more UEs.

For model deployment, refer to a method in a conventional technology. Details are not described in this disclosure.

Step 411. The RAN-side inference device obtains second correlation information, where the second correlation information is used to correlate third data of target UE on the UE with fourth data of the target UE on the base station.

For example, the RAN-side inference device may first obtain the fourth data of the target UE on the base station, and then obtain the second correlation information from the fourth data.

The target UE is one of the one or more UEs.

For example, the fourth data may be understood as inference data.

For example, the second correlation information may be Timestamp x2, C-RNTI x2, and Global RAN Node ID x2.

Step 412. The RAN-side inference device sends a third request to the UE, where the third request is used to request a first identifier of the target UE, and the third request includes the second correlation information.

In other words, the RAN-side inference device queries the UE for the corresponding first identifier, that is, Temporary UE ID X, of the target UE based on the second correlation information (Timestamp x2, C-RNTI x2, and Global RAN Node ID x2).

Step 413. The UE determines (searches for) the first identifier of the target UE based on the second correlation information.

Step 414. The UE sends the first identifier of the target UE to the RAN-side inference device.

Step 415. The RAN-side inference device locally searches for a corresponding target • model based on the first identifier (Temporary UE ID X) of the target UE, and determines a data analysis result of the target UE based on the second correlation information and the target model.

For example, the RAN-side inference device inputs, into the target model, the inference data (that is, the fourth data) corresponding to Timestamp x2, C-RNTI x2, and Global RAN Node ID x2 (that is, the second correlation information), to obtain the data analysis result.

Step 416. The RAN-side inference device determines policy information of the target UE based on the data analysis result of the target UE.

Step 417. The RAN-side inference device sends the policy information to the base station.

Based on the foregoing example, the RAN side may perform per UE data correlation via the UE, and the per UE data correlation may assist the RAN side in performing per UE data analysis.

Figure 5A:
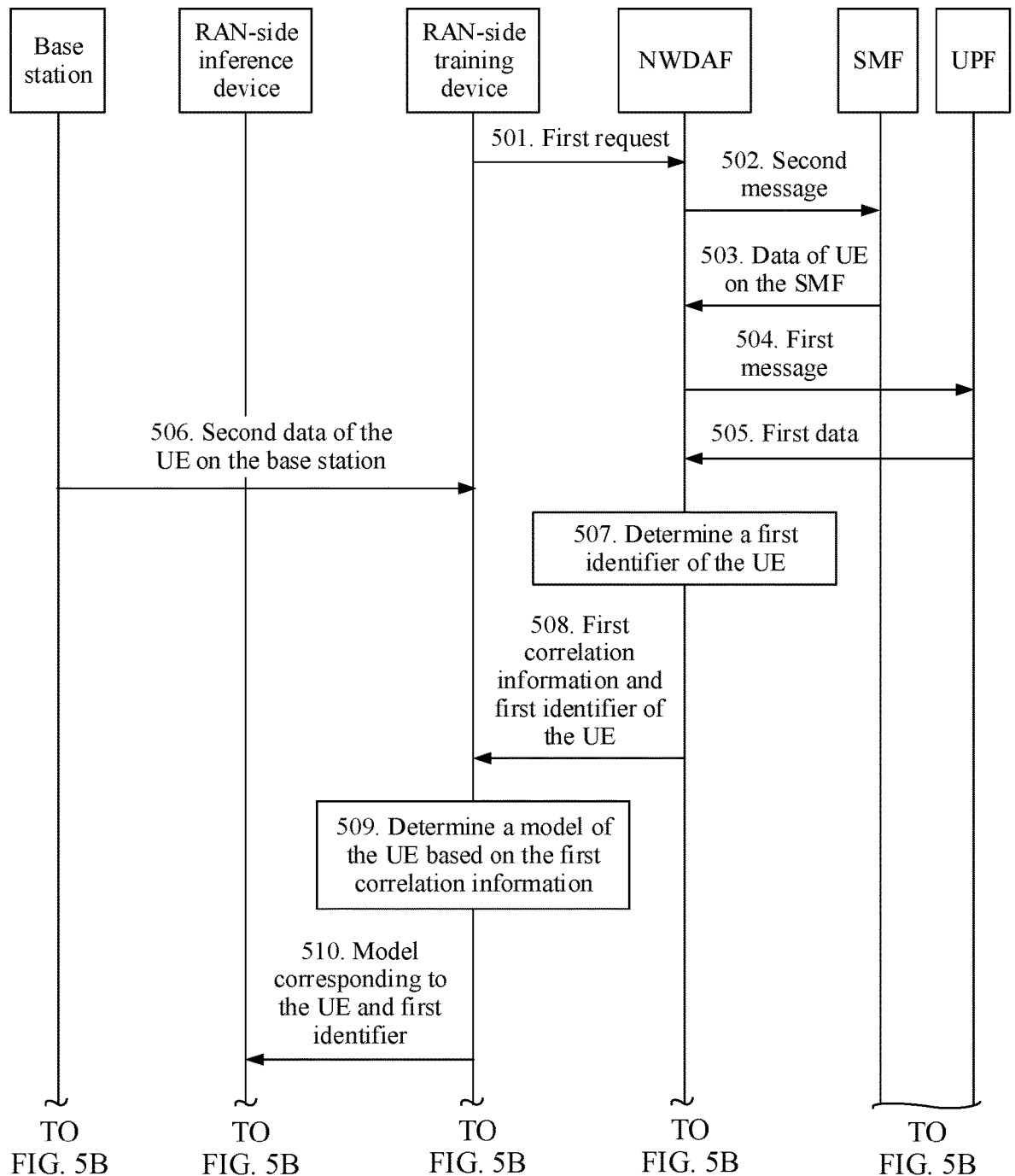
FIG. 5A and FIG. 5B are a flowchart of an example of another method for correlating data of a terminal device according to this disclosure.
Figure 5B:
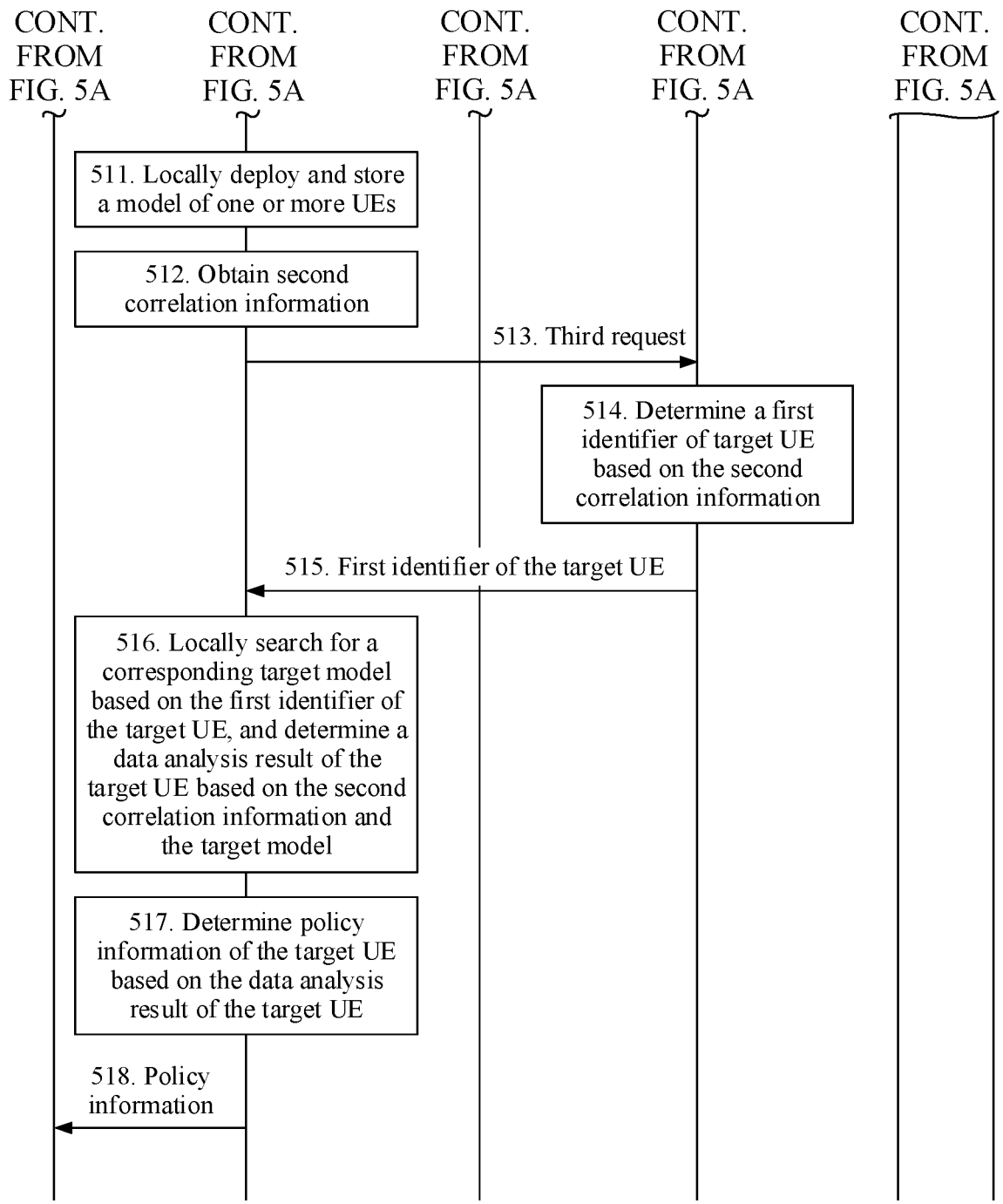

As shown in FIG. 5A and FIG. 5B, an embodiment of this disclosure provides an example of a method for correlating data of a terminal device. In this example, an example in which a first device is an NWDAF and a second device is a UPF is used for description. A specific procedure of the example may include the following steps.

Step 501. A RAN-side training device sends a first request to the NWDAF, where the first request is used to request first correlation information and a first identifier of UE, and the first request includes one or more of the following information: a time window (time window) and a network area (network area).

For example, there may be one or more UEs.

For example, there may be one or more pieces of first correlation information of same UE.

For example, the RAN-side training device requests correlation information that is of each UE in one or more UEs that accesses a base station in a network area in the time window and that is between the UPF and the base station, and a first identifier corresponding to the one or more UEs.

For example, the RAN-side training device may send the first request to the NWDAF by using Nnwdaf_Analytics-Subscription_Subscribe.

Step 502. The NWDAF sends a second message to an SMF, where the second message is used to request data of the one or more UEs on the SMF, the data of the one or more UEs on the SMF includes correlation information, and the correlation information is used to correlate first data of the one or more UEs on the UPF with the data of the one or more UEs on the SMF.

The correlation information is correlation information that is of each UE in the one or more UEs that accesses the base station in a network area in the time window and that is between the SMF and the UPF.

For example, the NWDAF may send the second message to the SMF by using Nsmf_EventExposure_Subscribe.

For example, the correlation information may include SUPI x, a timestamp (Timestamp x), and an IP address (UE IP x) of a terminal.

Step 503. The NWDAF receives the data of the one or more UEs on the SMF from the SMF.

For example, the SMF may send the data to the NWDAF by using Nsmf_EventExposure_Subscribe.

Step 504. The NWDAF sends a first message to the UPF, where the first message is used to request the first data of the one or more UEs on the UPF.

For example, the first data includes one or more pieces of first correlation information.

For example, the NWDAF may send the first message to the UPF by using Nupf_EventExposure_Subscribe.

For example, the first correlation information may include the timestamp (Timestamp x), the IP address (UE IP x) of the terminal, and tunnel information (AN Tunnel Info x) allocated by a RAN to a session of the terminal on an N3 interface.

Optionally, the NWDAF may send subscription information to the UPF via the SMF, where the subscription information is used to request the first data of the one or more UEs on the UPF.

Step 505. The UPF sends, to the NWDAF, the first data including the first correlation information.

For example, the UPF may send the first data to the NWDAF by using Nupf_EventExposure_Subscribe.

Optionally, the UPF may send notification information to the NWDAF via the SMF, where the notification information is used to send the first data of the one or more UEs on the UPF to the NWDAF.

Step 506. The RAN-side training device obtains second data of the UE on the base station from the base station through an X3 interface, where the second data includes the one or more pieces of first correlation information.

The base station is a gNB/RAN device serving the UE, and there is an N3 interface between the base station and the UPF.

For example, the first correlation information that can be perceived by the base station may include Timestamp x and AN Tunnel Info x.

Step 507. The NWDAF determines the first identifier of the UE.

For example, the NWDAF may obtain, for each UE through correlation based on the data obtained in steps 503 and 505, correlation information of the UE between the RAN and the UPF by using UE IP x, and then further determine, through aggregation, respective correlation information of each UE in the one or more UEs that accesses the base station in the network area in the time window. The first data includes an SUPI of the UE, and then the NWDAF allocates one Temporary UE ID (that is, the first identifier) to SUPI x of each UE. Through this step, Temporary UE ID is equivalent to anonymizing SUPI x, but Temporary UE ID can uniquely correspond to SUPI x. In this way, it is convenient for a RAN side to subsequently perform per UE data analysis for SUPI x, but the RAN side cannot perceive which terminal device the UE specifically is.

The respective first correlation information of each UE in the one or more UEs that is determined by the NWDAF may be as follows:

Temporary UE ID 1, List of <Timestamp, AN Tunnel Info> 1;

Temporary UE ID 2, List of <Timestamp, AN Tunnel Info> 2;

. . . ; and

Temporary UE ID N, List of <Timestamp, AN Tunnel Info> N, where N is a quantity of UEs.

Step 508. The NWDAF sends the first correlation information and the first identifier of the UE to the RAN-side training device.

For example, the NWDAF sends Temporary UE ID X, List of <Timestamp, AN Tunnel Info> X to the RAN-side training device, where X=1, 2, 3, . . . , N.

Specifically, the NWDAF may send the first correlation information and the first identifier of the UE to the RAN-side training device by using Nnwdaf_AnalyticsSubscription_Notify.

Step 509. The RAN-side training device determines a model of the UE based on the first correlation information.

A process of step 509 is a model training process. Specifically, the RAN-side training device determines, based on the respective first correlation information, that is, Temporary UE ID X, List of <Timestamp, AN Tunnel Info> X, of each UE in the one or more UEs from the NWDAF, and the second data corresponding to Timestamp x and AN Tunnel Info x that is obtained in step 506, training data corresponding to each UE in the one or more UEs, where X=1, 2, 3, . . . , N. Each piece of training data belongs to one UE, and the training data may include sample data corresponding to one or more groups of information (Timestamp x and AN Tunnel Info x).

Then, the RAN-side training device trains a corresponding model (Trained Model) based on the training data of each UE in the one or more UEs. The model may be identified by using Temporary UE ID. A format may be as follows:

Temporary UE ID 1, Trained Model 1;

Temporary UE ID 2, Trained Model 2;

. . . ; and

Temporary UE ID N, Trained Model N, where N is a quantity of UEs.

Step 510. The RAN-side training device sends the model corresponding to each UE in the one or more UEs and the corresponding first identifier to a RAN-side inference device.

Step 511. The RAN-side inference device locally deploys and stores the model of the one or more UEs.

For model deployment, refer to a method in a conventional technology. Details are not described in this disclosure.

Step 512. The RAN-side inference device obtains second correlation information, where the second correlation information is used to correlate third data of target UE on the UPF with fourth data of the target UE on the base station.

For example, the RAN-side inference device may first obtain the fourth data of the target UE on the base station, and then obtain the second correlation information from the fourth data.

For example, the fourth data may be understood as inference data.

For example, the second correlation information may be Timestamp y and AN Tunnel Info y.

Step 513. The RAN-side inference device sends a third request to the NWDAF, where the third request is used to request a first identifier of the target UE, and the third request includes the second correlation information.

In other words, the RAN-side inference device queries the NWDAF for the corresponding first identifier, that is, Temporary UE ID Y, of the target UE based on the second correlation information.

Step 514. The NWDAF determines (searches for) the first identifier of the target UE based on the second correlation information.

Step 515. The NWDAF sends the first identifier of the target UE to the RAN-side inference device.

It should be noted that, in processes of steps 513 to 515, the NWDAF needs to continuously obtain SUPI y, Timestamp y, and UE IP y from the SMF, also needs to continuously obtain Timestamp y, UE IP y and AN Tunnel Info y from the UPF, then determine SUPI y corresponding to Timestamp y and AN Tunnel Info y through correlation, and then further determine Temporary UE ID Y through local query.

Step 516. The RAN-side inference device locally searches for a corresponding target model based on the first identifier (Temporary UE ID Y) of the target UE, and determines a data analysis result of the target UE based on the second correlation information and the target model.

For example, the RAN-side inference device inputs, into the target model, the inference data (that is, the fourth data) corresponding to Timestamp y, RAN UE NGAP ID y, and Global RAN Node ID y (that is, the second correlation information), to obtain the data analysis result.

Step 517. The RAN-side inference device determines policy information of the target UE based on the data analysis result of the target UE.

Step 518. The RAN-side inference device sends the policy information to the base station.

Based on the foregoing example, the RAN side may perform per UE data correlation via a core network, and the per UE data correlation may assist the RAN side in performing per UE data analysis.

In an embodiment, that the NWDAF determines correlation information of same UE (an SUPI) when the UE accesses different base stations in steps 502 to 507 may be replaced by the following method: The NWDAF collects data of the UE on the RAN, where the data includes correlation identifier information, that is, Timestamp x and AN Tunnel Info x, of the UE on the RAN. The NWDAF collects data of the UE on the UPF, where the data includes the correlation identifier information of the UE on the UPF and UE IP x. The NWDAF collects data of the UE on the SMF, where the data includes UE IP x and UE ID (such as the SUPI) of the UE on the SMF. The NWDAF correlates information of the UE on all base stations to which the UE accesses and on a core network (that is, the RAN and the UPF/SMF), to obtain the correlation information, that is, a <Timestamp, AN Tunnel Info> list, of the UE when the UE accesses the different base stations.

Figure 6A:
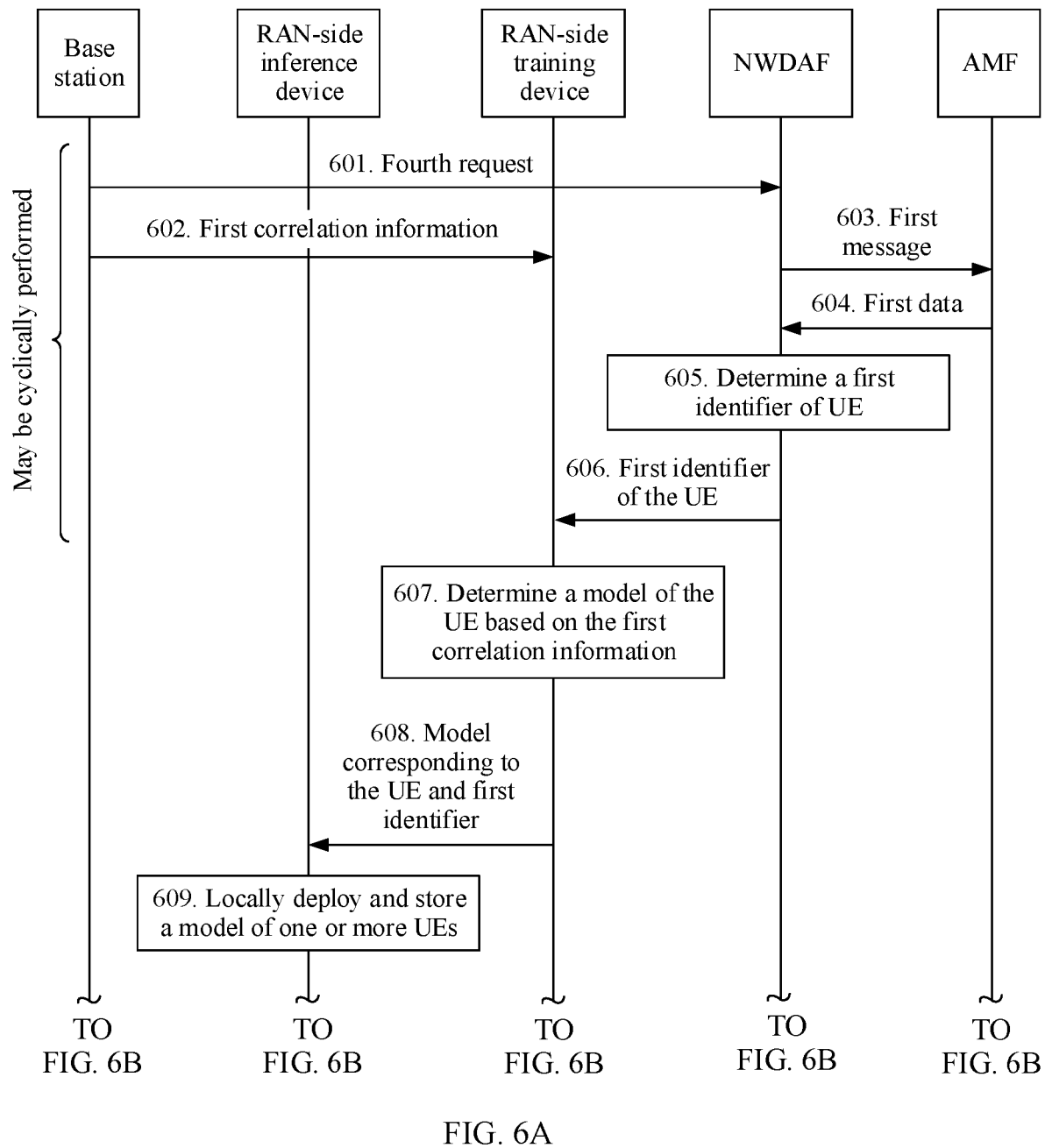
FIG. 6A and FIG. 6B are a flowchart of an example of another method for correlating data of a terminal device according to this disclosure.
Figure 6B:
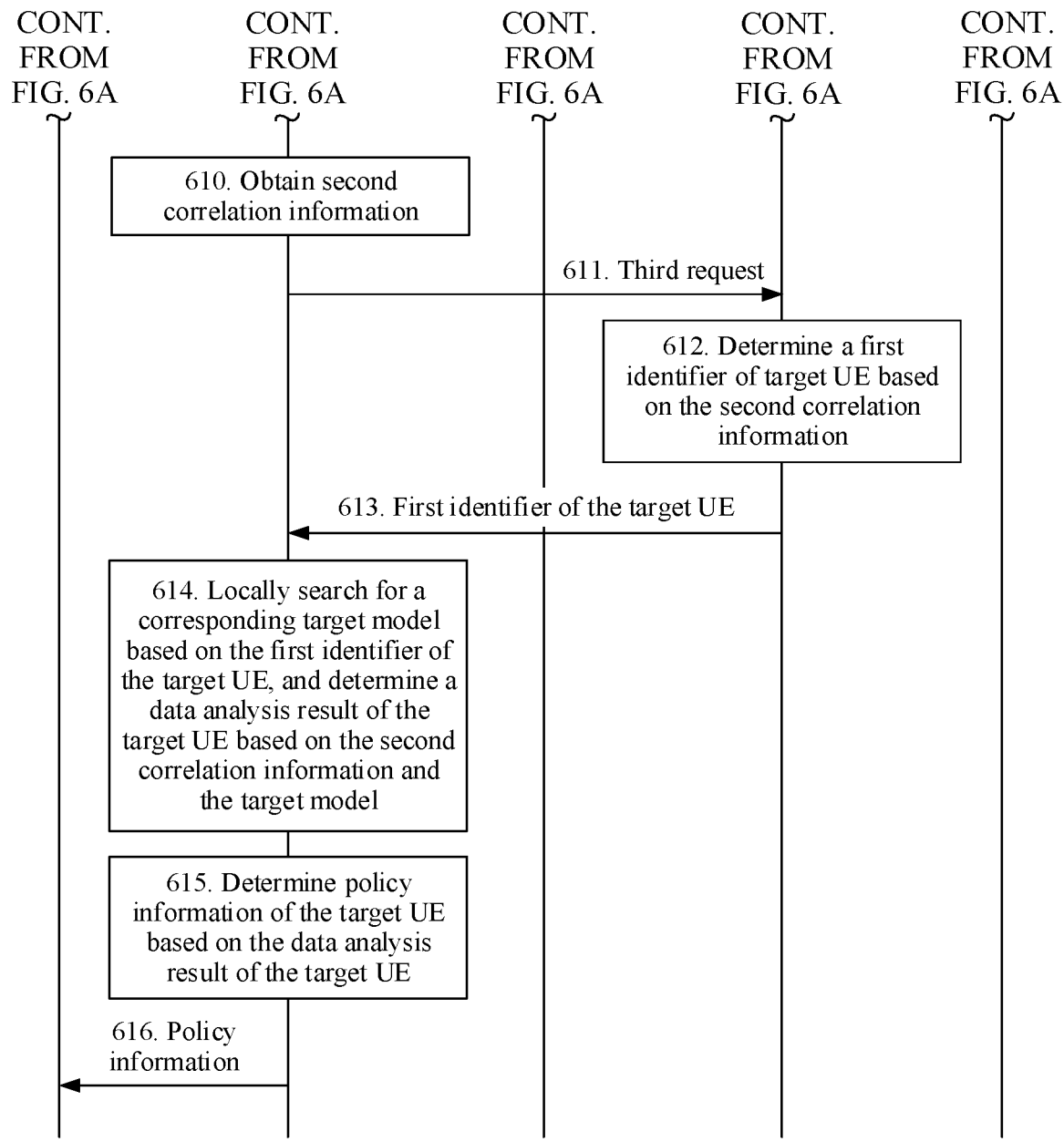

As shown in FIG. 6A and FIG. 6B, an embodiment of this disclosure further provides an example of a method for correlating data of a terminal device. In this example, a difference from the embodiment shown in FIG. 3A and FIG. 3B lies in that a base station directly provides first correlation information for a RAN-side training device, and the base station requests, for the RAN-side training device from an NWDAF, a first identifier of UE that corresponds to the first correlation information, so that the NWDAF may not need to transmit correlation information to the RAN-side training device subsequently, to reduce transmission pressure between the NWDAF and the RAN-side training device. Specifically, a specific procedure of the example may include the following steps.

Step 601. The base station sends a fourth request to the NWDAF, where the fourth request is used to request, for the RAN-side training device, the first identifier of the UE that corresponds to the first correlation information.

For example, the base station requests the first identifier of the UE from the NWDAF for the RAN-side training device based on the first correlation information (Timestamp x, RAN UE NGAP ID x, and Global RAN Node ID x). The first correlation information is used to correlate first data of the UE on an AMF with second data of the UE on the base station.

For example, the fourth request includes address information of the RAN-side training device.

For example, there may be one or more UEs.

For example, there is only one piece of first correlation information of same UE.

Step 602. The base station sends the first correlation information to the RAN-side training device.

The base station is a gNB/RAN device serving the UE, and there is an NG/N2 interface between the base station and the AMF.

For example, the first correlation information that can be perceived by the base station may include Timestamp x, RAN UE NGAP ID x, and Global RAN Node ID x.

It should be noted that the base station cannot perceive a unique identifier of the terminal device, such as an SUPI, an IMEI, or a GPSI.

Step 603. The NWDAF sends a first message to the AMF, where the first message is used to request the first data of one or more UEs on the AMF.

For example, the first data includes one piece of first correlation information.

For example, the NWDAF may send the first message to the AMF by using Namf_EventExposure_Subscribe.

For example, the first correlation information may include one or more of the following information: an identifier (SUPI x) of a terminal device, a timestamp (Timestamp x), an identifier (RAN UE NGAP ID x) allocated by a RAN to the terminal device on an NG interface, and a globally unique identifier (Global RAN Node ID x) of the RAN.

Step 604. The AMF sends, to the NWDAF, the first data including the first correlation information.

For example, the AMF may send the first data to the NWDAF by using Namf_EventExposure_Notify.

Step 605. The NWDAF determines the first identifier of the UE.

For example, the NWDAF may learn of, based on the first data obtained in step 604, respective correlation information of each UE in the one or more UEs that accesses the base station in a network area in a time window. The first data includes the SUPI of the UE, and the NWDAF may allocate one Temporary UE ID (that is, the first identifier) to SUPI x of each UE. Through this step, Temporary UE ID is equivalent to anonymizing SUPI x, but Temporary UE ID can uniquely correspond to SUPI x. In this way, it is convenient for a RAN side to subsequently perform per (per) UE data analysis for SUPI x, but the RAN side cannot perceive which terminal device the UE specifically is.

The respective first correlation information of each UE in the one or more UEs that is determined by the NWDAF may be as follows:

Temporary UE ID x, Timestamp x, RAN UE NGAP ID x, and Global RAN Node ID x.

Step 606. The NWDAF sends the first identifier of the UE to the RAN-side training device.

For example, the NWDAF sends Temporary UE ID x, Timestamp x, RAN UE NGAP ID x, and Global RAN Node ID x to the RAN-side training device.

For example, the NWDAF may send the first correlation information and the first identifier of the UE to the RAN-side training device by using Nnwdaf_AnalyticsSubscription_Notify.

It should be noted that step 601 to step 606 may be cyclically performed, to finally determine first correlation information, that is, Temporary UE ID X, List of <Timestamp, RAN UE NGAP ID, Global RAN Node ID> X, corresponding to one terminal device, where X=1, 2, 3, . . . , N, and N indicates a quantity of pieces of first correlation information of a same terminal device. In a subsequent step, the RAN-side training device may determine training data of a terminal device based on first correlation information corresponding to the terminal device. For details, refer to step 607.

Step 607. The RAN-side training device determines a model of the UE based on the first correlation information.

A process of step 607 is a model training process. Specifically, the RAN-side training device determines, based on the respective first correlation information, that is, Temporary UE ID X, List of <Timestamp, RAN UE NGAP ID, Global RAN Node ID> X, of each UE in the one or more UEs, and the second data corresponding to Timestamp x, RAN UE NGAP ID x, and Global RAN Node ID x in step 604, training data corresponding to each UE in the one or more UEs, where X=1, 2, 3, . . . , N. Each piece of training data belongs to one UE, and the training data may include sample data corresponding to one or more groups of information (Timestamp x, RAN UE NGAP ID x, and Global RAN Node ID x).

Then, the RAN-side training device trains a corresponding model (Trained Model) based on the training data of each UE in the one or more UEs. The model is identified by using Temporary UE ID. A format may be as follows:

Temporary UE ID 1, Trained Model 1;
Temporary UE ID 2, Trained Model 2;
. . . ; and
Temporary UE ID N, Trained Model N, where N is a quantity of UEs.

Step 608. The RAN-side training device sends the model corresponding to each UE in the one or more UEs and the corresponding first identifier to a RAN-side inference device, where a first identifier of UE identifies a model of the UE.

Step 609. The RAN-side inference device locally deploys and stores the model of the one or more UEs.

For model deployment, refer to a method in a conventional technology. Details are not described in this disclosure.

Step 610. The RAN-side inference device obtains second correlation information, where the second correlation information is used to correlate third data of target UE on the AMF with fourth data of the target UE on the base station.

The target UE is one of the one or more UEs.

For example, the RAN-side inference device may first obtain the fourth data of the target UE on the base station, and then obtain the second correlation information from the fourth data.

For example, the fourth data may be understood as inference data.

For example, the second correlation information may be Timestamp y, RAN UE NGAP ID y, and Global RAN Node ID y.

Step 611. The RAN-side inference device sends a third request to the NWDAF, where the third request is used to request a first identifier of the target UE, and the third request includes the second correlation information.

In other words, the RAN-side inference device queries the NWDAF for the corresponding first identifier, that is, Temporary UE ID Y, of the target UE based on the second correlation information.

Step 612. The NWDAF determines (searches for) the first identifier of the target UE based on the second correlation information.

Step 613. The NWDAF sends the first identifier of the target UE to the RAN-side inference device.

It should be noted that, in processes of steps 611 to 113, the NWDAF needs to continuously obtain, from the AMF, Timestamp y, RAN UE NGAP ID y, and SUPI y corresponding to Global RAN Node ID y, and then determine Temporary UE ID Y.

Step 614. The RAN-side inference device locally searches for a corresponding target model based on the first identifier (Temporary UE ID Y) of the target UE, and determines a data analysis result of the target UE based on the second correlation information and the target model.

For example, the RAN-side inference device inputs, into the target model, the inference data (that is, the fourth data) corresponding to Timestamp y, RAN UE NGAP ID y, and Global RAN Node ID y (that is, the second correlation information), to obtain the data analysis result.

Step 615. The RAN-side inference device determines policy information of the target UE based on the data analysis result of the target UE.

Step 616. The RAN-side inference device sends the policy information to the base station.

In the foregoing embodiments provided in this disclosure, solutions of the method for correlating data of a terminal device provided in embodiments of this disclosure are separately described from perspectives of functional modules or devices and interaction between functional modules or devices. It may be understood that, to achieve the foregoing functions, the functional modules or devices such as the first device, the second access network device, and the third access network device include corresponding hardware structures and/or software modules for performing the functions. A person skilled in the art should easily be aware that, in combination with units and algorithm steps of the examples described in embodiments disclosed in this disclosure, this disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

Figure 7:
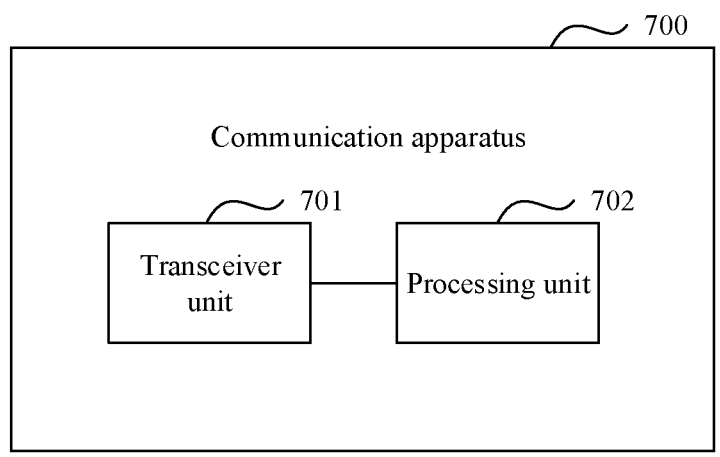
FIG. 7 is a schematic diagram of a structure of a communication apparatus according to this disclosure.

For example, when the foregoing functional modules or devices implement corresponding functions by using software modules, for a communication apparatus provided in an embodiment of this disclosure, refer to FIG. 7. A communication apparatus 700 may include a transceiver unit 701 and a processing unit 702. The transceiver unit 701 is configured to be used by the communication apparatus 700 to receive information (a message or data) or send information (a message or data). The processing unit 702 is configured to control and manage an action of the communication apparatus 700. The processing unit 702 may further control a step performed by the transceiver unit 701.

For example, the communication apparatus 700 may be the first device in the foregoing embodiments, and may be specifically a processor, a chip, a chip system, a functional module, or the like in the first device. Alternatively, the communication apparatus 700 may be the second access network device in the foregoing embodiments, and may be specifically a processor, a chip, a chip system, a functional module, or the like in the second access network device. Alternatively, the communication apparatus 700 may be the third access network device in the foregoing embodiments, and may be specifically a processor, a chip, a chip system, a function module, or the like in the third access network device.

In an embodiment, when the communication apparatus 700 is configured to implement a function of the first device in the foregoing embodiments, the communication apparatus 700 may specifically include:

the processing unit 702 is configured to obtain first data of a terminal device on a second device, where the first data includes first correlation information, the first correlation information is used to correlate the first data with second data of the terminal device on a first access network device, the second data includes the first correlation information, and there are one or more terminal devices, and determine a first identifier of the terminal device; and the transceiver unit 701 is configured to send the first correlation information and the first identifier of the terminal device to a second access network device.

In an embodiment, the first correlation information may include one or more of the following information: time information, an identifier allocated by the first access network device to the terminal device, an identifier allocated by the second device to the terminal device, an identifier of the first access network device, and an identifier of the second device.

In an embodiment, the transceiver unit 701 is further configured to receive a first request from the second access network device, where the first request is used to request the first correlation information and the first identifier of the terminal device.

For example, the first request may include one or more of the following information: a time window and a network area.

In an example, the first device is a data analysis network element, and the second device is an access and mobility management function network element.

In another example, the first device is a data analysis network element, and the second device is a user plane function network element.

In still another example, the first device and the second device are the terminal device.

For example, the first data of the terminal device on the second device further includes a second identifier of the terminal device. When the first device is a data analysis network element, and the second device is an access and mobility management function network element or a user plane function network element, when determining the first identifier of the terminal device, the processing unit 702 is specifically configured to determine the first identifier of the terminal device based on the second identifier of the terminal device.

For example, when the first device and the second device are the terminal device, when determining the first identifier of the terminal device, the processing unit 702 is specifically configured to: control the transceiver unit 701 to send a second request to a third device, and receive the first identifier of the terminal device from the third device, where the second request is used to request the first identifier of the terminal device, and the second request includes a second identifier of the terminal device.

In an embodiment, the transceiver unit 701 is further configured to receive a third request from a third access network device, where the third request is used to request a first identifier of a target terminal device, the third request includes second correlation information, and the second correlation information is used to correlate third data of the target terminal device on the second device with fourth data of the target terminal device on the first access network device; the processing unit 702 is configured to determine the first identifier of the target terminal device based on the second correlation information; and the transceiver unit 701 is further configured to send the first identifier of the target terminal device to the third access network device.

In another embodiment, when the communication apparatus 700 is configured to implement a function of the second access network device in the foregoing embodiments, the communication apparatus 700 may specifically include:

the transceiver unit 701 is configured to receive first correlation information and a first identifier of a terminal device from a first device, where the first correlation information is used to correlate first data of the terminal device on a second device with second data of the terminal device on a first access network device, the second data includes the first correlation information, and there are one or more terminal devices; the processing unit 702 is configured to determine a model of the terminal device based on the first correlation information, where the model of the terminal device is used to determine a data analysis result of the terminal device; and the transceiver unit 701 is further configured to send the model of the terminal device and the first identifier of the terminal device to a third access network device, where the first identifier of the terminal device identifies the model of the terminal device.

In an embodiment, the first correlation information includes one or more of the following information: time information, an identifier allocated by the first access network device to the terminal device, an identifier allocated by the second device to the terminal device, an identifier of the first access network device, and an identifier of the second device.

For example, when determining, based on the first correlation information, the model corresponding to the terminal device, the processing unit 702 is specifically configured to: determine, based on the first correlation information and the second data of the terminal device on the first access network device, training data corresponding to the terminal device, and determine the model of the terminal device based on the training data corresponding to the terminal device.

In another embodiment, when the communication apparatus 700 is configured to implement a function of the third access network device in the foregoing embodiments, the communication apparatus 700 may specifically include:

the transceiver unit 701 is configured to receive a model of at least one terminal device and a first identifier of the at least one terminal device from a second access network device, where a first identifier of each terminal device identifies a corresponding model of the terminal device, and the model of each terminal device is used to determine a corresponding data analysis result of the terminal device; the processing unit 702 is configured to obtain second correlation information, where the second correlation information is used to correlate third data of a target terminal device on a second device with fourth data of the target terminal device on a first access network device, and determine a data analysis result of the target terminal device based on the model of the at least one terminal device, the first identifier of the at least one terminal device, and the second correlation information. The target terminal device is one of the at least one terminal device In an embodiment, the processing unit 702 is further configured to determine policy information of the target terminal device based on the data analysis result of the target terminal device; and the transceiver unit 701 is further configured to send the policy information to the first access network device.

For example, when determining the data analysis result of the target terminal device based on the model of the at least one terminal device, the first identifier of the at least one terminal device, and the second correlation information, the processing unit 702 is specifically configured to: obtain a first identifier of the target terminal device; determine, based on the first identifier of the target terminal device, the model of the at least one terminal device, and the first identifier of the at least one terminal device, a target model corresponding to the first identifier of the target terminal device; and determine the data analysis result of the target terminal device based on the second correlation information and the target model.

For example, when obtaining the first identifier of the target terminal device, the processing unit 702 is specifically configured to control the transceiver unit 701 to: send a third request to a first device, where the third request is used to request the first identifier of the target terminal device, and the third request includes the second correlation information, and receive the first identifier of the target terminal device from the first device.

In an embodiment, when determining the data analysis result of the target terminal device based on the second correlation information and the target model, the processing unit 702 is specifically configured to: determine inference data of the target terminal device based on the second correlation information, where the inference data includes the fourth data of the target terminal device on the first access network device, and determine the data analysis result of the target terminal device based on the inference data of the target terminal device and the target model.

In an embodiment, the second correlation information includes one or more of the following information: time information, an identifier allocated by the first access network device to the terminal device, and an identifier of the first access network device.

It should be noted that, in embodiments of this disclosure, division into the units is an example and is merely a logical function division, and may be other division in actual implementation Functional units in embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor (processor) to perform all or some of the steps of the methods in embodiments of this disclosure. The storage medium includes any medium that can store program code, such as a USB flash drive, a removable hard disk, a read only memory (read only memory, ROM), a random access memory (random access memory, RAM), a magnetic disk, or an optical disc.

Figure 8:
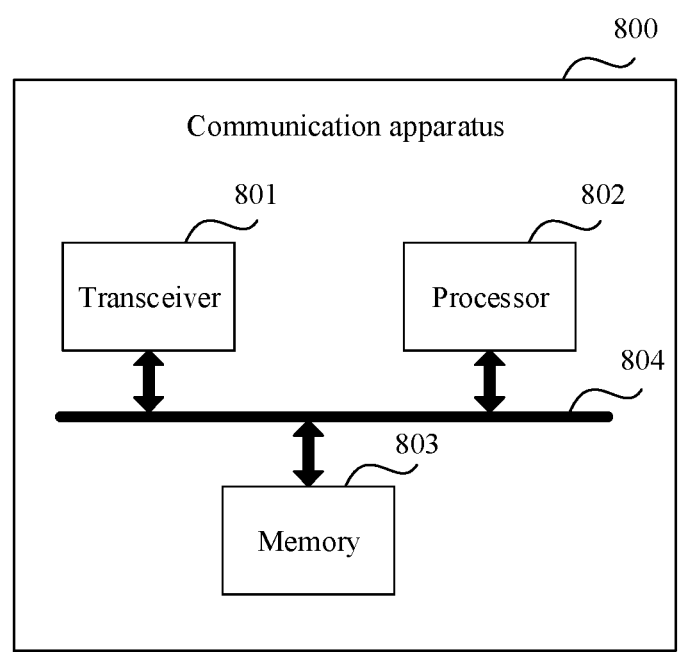
FIG. 8 is a diagram of a structure of a communication apparatus according to this disclosure.

For another example, when the foregoing functional modules or devices implement corresponding functions by using hardware, for a communication apparatus provided in an embodiment of this disclosure, refer to FIG. 8. A communication apparatus 800 may include a transceiver 801 and a processor 802. Optionally, the communication apparatus 800 may further include a memory 803. The memory 803 may be disposed inside the communication apparatus 800, or may be disposed outside the communication apparatus 800. The processor 802 may control the transceiver 801 to receive and send data, information, or the like.

For example, the processor 802 may be a central processing unit (central processing unit, CPU), a network processor (network processor, NP), or a combination of the CPU and the NP. The processor 802 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof.

The transceiver 801, the processor 802, and the memory 803 are connected to each other. Optionally, the transceiver 801, the processor 802, and the memory 803 are connected to each other through a bus 804. The bus 804 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one bold line is for representing the bus in FIG. 7, but this does not mean that there is only one bus or only one type of bus.

In an embodiment, the memory 803 is configured to store a program and the like. Specifically, the program may include program code, and the program code includes computer operation instructions. The memory 803 may include a RAM, and may further include a non-volatile memory (non-volatile memory), for example, one or more disk memories. The processor 802 executes the application program stored in the memory 803, to implement the foregoing function, to further implement a function of the communication apparatus 800.

For example, the communication apparatus 800 may be a first device, a second access network device, or a third access network device.

In an embodiment, when the communication apparatus 800 is configured to implement a function of the first device in the foregoing embodiments, the communication apparatus 800 may specifically include:

the processor 802 is configured to obtain first data of a terminal device on a second device, where the first data includes first correlation information, the first correlation information is used to correlate the first data with second data of the terminal device on a first access network device, the second data includes the first correlation information, and there are one or more terminal devices, and determine a first identifier of the terminal device; and the transceiver 801 is configured to send the first correlation information and the first identifier of the terminal device to a second access network device.

In an embodiment, the first correlation information may include one or more of the following information: time information, an identifier allocated by the first access network device to the terminal device, an identifier allocated by the second device to the terminal device, an identifier of the first access network device, and an identifier of the second device.

In an embodiment, the transceiver 801 is further configured to receive a first request from the second access network device, where the first request is used to request the first correlation information and the first identifier of the terminal device.

For example, the first request may include one or more of the following information: a time window and a network area.

In an example, the first device is a data analysis network element, and the second device is an access and mobility management function network element.

In another example, the first device is a data analysis network element, and the second device is a user plane function network element.

In still another example, the first device and the second device are the terminal device.

For example, the first data of the terminal device on the second device further includes a second identifier of the terminal device. When the first device is a data analysis network element, and the second device is an access and mobility management function network element or a user plane function network element, when determining the first identifier of the terminal device, the processor 802 is specifically configured to generate the first identifier of the terminal device for the terminal device based on the second identifier of the terminal device.

For example, when the first device and the second device are the terminal device, when determining the first identifier of the terminal device, the processor 802 is specifically configured to: control the transceiver unit 801 to send a second request to a third device, and receive the first identifier of the terminal device from the third device, where the second request is used to request the first identifier of the terminal device, and the second request includes a second identifier of the terminal device.

In an embodiment, the transceiver 801 is further configured to receive a third request from a third access network device, where the third request is used to request a first identifier of a target terminal device, the third request includes second correlation information, and the second correlation information is used to correlate third data of the target terminal device on the second device with fourth data of the target terminal device on the first access network device; the processor 802 is configured to determine the first identifier of the target terminal device based on the second correlation information; and the transceiver 801 is further configured to send the first identifier of the target terminal device to the third access network device.

In another embodiment, when the communication apparatus 800 is configured to implement a function of the second access network device in the foregoing embodiments, the communication apparatus 800 may specifically include:

the transceiver 801 is configured to receive first correlation information and a first identifier of a terminal device from a first device, where the first correlation information is used to correlate first data of the terminal device on a second device with second data of the terminal device on a first access network device, the second data includes the first correlation information, and there are one or more terminal devices; the processor 802 is configured to determine a model of the terminal device based on the first correlation information, where the model of the terminal device is used to determine a data analysis result of the terminal device; and the transceiver 801 is further configured to send the model of the terminal device and the first identifier of the terminal device to a third access network device, where the first identifier of the terminal device identifies the model of the terminal device.

In an embodiment, the first correlation information includes one or more of the following information: time information, an identifier allocated by the first access network device to the terminal device, an identifier allocated by the second device to the terminal device, an identifier of the first access network device, and an identifier of the second device.

For example, when determining, based on the first correlation information, the model corresponding to the terminal device, the processor 802 is specifically configured to: determine, based on the first correlation information and the second data of the terminal device on the first access network device, training data corresponding to the terminal device, and determine the model of the terminal device based on the training data corresponding to the terminal device.

In another embodiment, when the communication apparatus 800 is configured to implement a function of the third access network device in the foregoing embodiments, the communication apparatus 800 may specifically include:

the transceiver 801 is configured to receive a model of at least one terminal device and a first identifier of the at least one terminal device from a second access network device, where a first identifier of each terminal device identifies a corresponding model of the terminal device, and the model of each terminal device is used to determine a corresponding data analysis result of the terminal device; the processor 802 is configured to obtain second correlation information, where the second correlation information is used to correlate third data of a target terminal device on a second device with fourth data of the target terminal device on a first access network device, and determine a data analysis result of the target terminal device based on the model of the at least one terminal device, the first identifier of the at least one terminal device, and the second correlation information. The target terminal device is one of the at least one terminal device In an embodiment, the processor 802 is further configured to determine policy information of the target terminal device based on the data analysis result of the target terminal device; and the transceiver 801 is further configured to send the policy information to the first access network device.

For example, when determining the data analysis result of the target terminal device based on the model of the at least one terminal device, the first identifier of the at least one terminal device, and the second correlation information, the processor 802 is specifically configured to: obtain a first identifier of the target terminal device; determine, based on the first identifier of the target terminal device, the model of the at least one terminal device, and the first identifier of the at least one terminal device, a target model corresponding to the first identifier of the target terminal device; and determine the data analysis result of the target terminal device based on the second correlation information and the target model.

For example, when obtaining the first identifier of the target terminal device, the processor 802 is specifically configured to control the transceiver 801 to: send a third request to a first device, where the third request is used to request the first identifier of the target terminal device, and the third request includes the second correlation information, and receive the first identifier of the target terminal device from the first device.

In an embodiment, when determining the data analysis result of the target terminal device based on the second correlation information and the target model, the processor 802 is specifically configured to: determine inference data of the target terminal device based on the second correlation information, where the inference data includes the fourth data of the target terminal device on the first access network device, and determine the data analysis result of the target terminal device based on the inference data of the target terminal device and the target model.

In an embodiment, the second correlation information includes one or more of the following information: time information, an identifier allocated by the first access network device to the terminal device, and an identifier of the first access network device.

Figure 9:
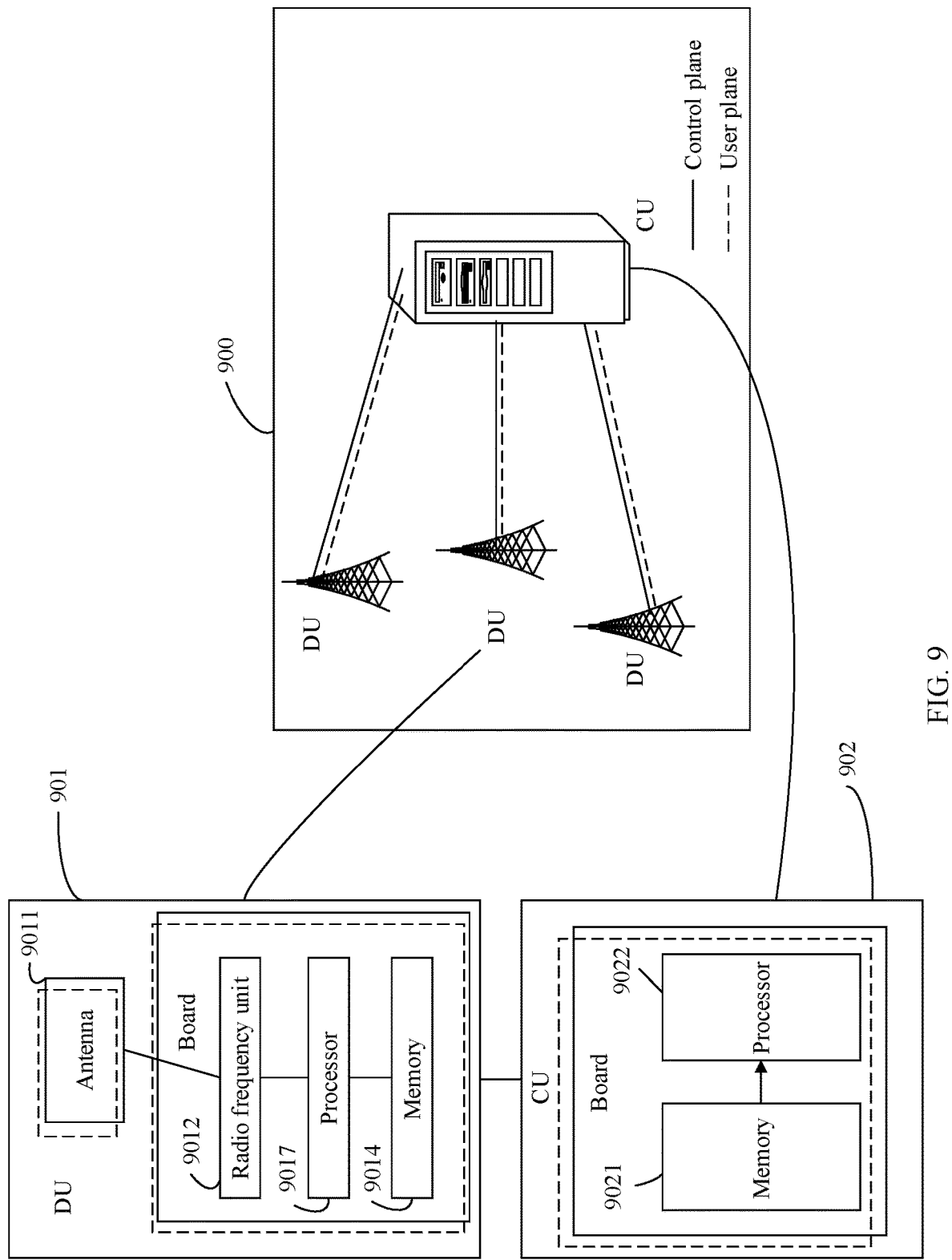
FIG. 9 is a schematic diagram of a structure of an access network device according to this disclosure.

FIG. 9 is a schematic diagram of a structure of an access network device according to an embodiment of this disclosure, for example, may be a schematic diagram of a structure of a base station. As shown in FIG. 9, the access network device may be applied to the communication system shown in FIG. 1, and may perform a function of any access network device in the foregoing method embodiments. A base station 900 may include one or more distributed units (DUs) 901 and one or more centralized units (CUs) 902. The DU 901 may include at least one antenna 9011, at least one radio frequency unit 9012, at least one processor 9017, and at least one memory 9014. The DU 901 is mainly configured to receive and send a radio frequency signal, perform conversion between a radio frequency signal and a baseband signal, and perform partial baseband processing. The CU 902 may include at least one processor 9022 and at least one memory 9021. The CU 902 and the DU 901 may communicate with each other through an interface. A control plane interface may be Fs-C, for example, F1-C. A user plane interface may be Fs-U, for example, F1-U.

The CU 902 is mainly configured to: perform baseband processing, control the base station, and the like. The DU 901 and the CU 902 may be physically disposed together, or may be physically separated, in other words, the base station may be a distributed base station. The CU 902 is a control center of the base station, may also be referred to as a processing unit, and is mainly configured to implement a baseband processing function. For example, the CU 902 may be configured to control the base station to perform the operation procedure related to the network device in the method embodiment in FIG. 4A and FIG. 4B or FIG. 6A and FIG. 6B.

For example, baseband processing on the CU and the DU may be divided based on a protocol layer of a wireless network. For example, functions of a PDCP layer and a layer above the PDCP layer are deployed on the CU, and functions of protocol layers below the PDCP layer, such as an RLC layer and a MAC layer, are deployed on the DU. For another example, the CU implements functions of an RRC layer and the PDCP layer, and the DU implements functions of the RLC layer, the MAC layer, and a physical (physical, PHY) layer.

In addition, optionally, the base station 900 may include one or more radio frequency units (RUs), one or more DUs, and one or more CUs. The DU may include at least one processor 9017 and at least one memory 9014, the RU may include at least one antenna 9011 and at least one radio frequency unit 9012, and the CU may include at least one processor 9022 and at least one memory 9021.

In an example, the CU 902 may include one or more boards. A plurality of boards may jointly support a radio access network (for example, a 5G network) with a single access indication, or may separately support radio access networks (for example, an LTE network, a 5G network, or another network) with different access standards. The memory 9021 and the processor 9022 may serve the one or more boards. In other words, the memory and the processor may be disposed on each board. Alternatively, the plurality of boards may share a same memory and a same processor. In addition, a necessary circuit may further be disposed on each board. The DU 901 may include one or more boards. A plurality of boards may jointly support a radio access network (for example, a 5G network) with a single access indication, or may separately support radio access networks (for example, an LTE network, a 5G network, or another network) with different access standards. The memory 9014 and the processor 9017 may serve the one or more boards. In other words, the memory and the processor may be disposed on each board. Alternatively, the plurality of boards may share a same memory and a same processor. In addition, a necessary circuit may further be disposed on each board.

Based on the foregoing embodiments, an embodiment of this disclosure provides a communication system. The communication system may include the first device, the second access network device, the third access network device (a master station or a secondary station), and the like in the foregoing embodiments.

An embodiment of this disclosure further provides a computer-readable storage medium. The computer-readable storage medium is configured to store a computer program. When the computer program is executed by a computer, the computer may implement the method for correlating data of a terminal device provided in the foregoing method embodiments.

An embodiment of this disclosure further provides a computer program product. The computer program product is configured to store a computer program. When the computer program is executed by a computer, the computer may implement the method for correlating data of a terminal device provided in the foregoing method embodiments.

An embodiment of this disclosure further provides a chip. The chip is coupled to a memory, and the chip is configured to implement the method for correlating data of a terminal device provided in the foregoing method embodiments.

An embodiment of this disclosure further provides a chip system. The chip system includes a processor, configured to support a communication apparatus in implementing a function in the aspects. In an embodiment, the chip system further includes a memory. The memory is configured to store program instructions and data that are necessary for the communication apparatus. The chip system may include a chip, or may include a chip and another discrete component.

A person skilled in the art should understand that embodiments of this disclosure may be provided as a method, a system, or a computer program product. Therefore, this disclosure may use a form of hardware only embodiments, software only embodiments, or embodiments with a combination of software and hardware. In addition, this disclosure may use a form of a computer program product that is implemented on one or more computer-usable storage media (including but not limited to a magnetic disk memory, a CD-ROM, an optical memory, and the like) that include computer-usable program code.

This disclosure is described with reference to the flowcharts and/or block diagrams of the method, the device (system), and the computer program product according to this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

The computer program instructions may alternatively be stored in a computer-readable memory that can indicate the computer or the another programmable data processing device to work in a specific manner, so that the instructions stored in the computer-readable memory generate an artifact including an instruction apparatus. The instruction apparatus implements a specific function in one or more processes in the flowcharts and/or in one or more blocks in the block diagrams.

The computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this disclosure without departing from the scope of this disclosure. In this way, this disclosure is intended to cover these modifications and variations of this disclosure provided that they fall within the scope of the claims of this disclosure and their equivalent technologies.

What is claimed is:

1. A method for correlating data of a terminal device, comprising:
   obtaining, by a first device, first data of a terminal device on a second device, wherein the first data comprises first correlation information, the first correlation information is used to correlate the first data with second data of the terminal device on a first access network device, the second data comprises the first correlation information, and there are one or more terminal devices;
   determining, by the first device, a first identifier of the terminal device; and
   sending, by the first device, the first correlation information and the first identifier of the terminal device to a second access network device.

2. The method according to claim 1, wherein the first correlation information comprises one or more of the following information: time information, an identifier allocated by the first access network device to the terminal device, an identifier allocated by the second device to the terminal device, an identifier of the first access network device, and an identifier of the second device.

3. The method according to claim 1, wherein the method further comprises:
   receiving, by the first device, a first request from the second access network device, wherein the first request is used to request the first correlation information and the first identifier of the terminal device.

4. The method according to claim 1, wherein the first device is a data analysis network element, and the second device is an access and mobility management function network element.

5. The method according to claim 4, wherein the first data of the terminal device on the second device further comprises a second identifier of the terminal device; and
   the determining, by the first device, a first identifier of the terminal device comprises:
   determining, by the first device, the first identifier of the terminal device based on the second identifier of the terminal device.

6. The method according to claim 1, wherein the first device is a data analysis network element, and the second device is a user plane function network element.

7. The method according to claim 1, wherein the first device and the second device are the terminal device.

8. The method according to claim 7, wherein the determining, by the first device, a first identifier of the terminal device comprises:
   sending, by the first device, a second request to a third device, wherein the second request is used to request the first identifier of the terminal device, and the second request comprises a second identifier of the terminal device; and
   receiving, by the first device, the first identifier of the terminal device from the third device.

9. The method according to claim 1, wherein the method further comprises:
   receiving, by the first device, a third request from a third access network device, wherein the third request is used to request a first identifier of a target terminal device, the third request comprises second correlation information, and the second correlation information is used to correlate third data of the target terminal device on the second device with fourth data of the target terminal device on the first access network device;
   determining, by the first device, the first identifier of the target terminal device based on the second correlation information; and
   sending, by the first device, the first identifier of the target terminal device to the third access network device.

10. The method according to claim 1, further comprising:
    receiving, by the second access network device, the first correlation information and the first identifier of the terminal device from the first device;
    determining, by the second access network device, a model of the terminal device based on the first correlation information, wherein the model of the terminal device is used to determine a data analysis result of the terminal device; and
    sending, by the second access network device, the model of the terminal device and the first identifier of the terminal device to a third access network device, wherein the first identifier of the terminal device identifies the model of the terminal device.

11. The method according to claim 10, wherein the determining, by the second access network device, a model of the terminal device based on the first correlation information comprises:
    determining, by the second access network device based on the first correlation information and the second data of the terminal device on the first access network device, training data corresponding to the terminal device; and determining, by the second access network device, the model of the terminal device based on the training data corresponding to the terminal device.

12. The method according to claim 10, further comprising:
receiving, by the third access network device, the model of at least one terminal device and the first identifier of the at least one terminal device from the second access network device;
obtaining, by the third access network device, second correlation information, wherein the second correlation information is used to correlate third data of a target terminal device on the second device with fourth data of the target terminal device on the first access network device, and the target terminal device is one of the at least one terminal device; and
determining, by the third access network device, a data analysis result of the target terminal device based on the model of the at least one terminal device, the first identifier of the at least one terminal device, and the second correlation information.

13. A method for correlating data of a terminal device, comprising:
receiving, by a third access network device, a model of at least one terminal device and a first identifier of the at least one terminal device from a second access network device, wherein a first identifier of each terminal device of the at least one terminal device identifies a corresponding model of the terminal device, and the model of each terminal device of the at least one terminal device is used to determine a corresponding data analysis result of the terminal device;
obtaining, by the third access network device, second correlation information, wherein the second correlation information is used to correlate third data of a target terminal device on a second device with fourth data of the target terminal device on a first access network device, and the target terminal device is one of the at least one terminal device; and
determining, by the third access network device, a data analysis result of the target terminal device based on the model of the at least one terminal device, the first identifier of the at least one terminal device, and the second correlation information.

14. The method according to claim 13, wherein the method further comprises:
determining, by the third access network device, policy information of the target terminal device based on the data analysis result of the target terminal device; and
sending, by the third access network device, the policy information to the first access network device.

15. The method according to claim 13, wherein the determining, by the third access network device, a data analysis result of the target terminal device based on the model of the at least one terminal device, the first identifier of the at least one terminal device, and the second correlation information comprises:
obtaining, by the third access network device, a first identifier of the target terminal device;
determining, by the third access network device based on the first identifier of the target terminal device, the model of the at least one terminal device, and the first identifier of the at least one terminal device, a target model corresponding to the first identifier of the target terminal device; and
determining, by the third access network device, the data analysis result of the target terminal device based on the second correlation information and the target model.

16. The method according to claim 15, wherein the obtaining, by the third access network device, a first identifier of the target terminal device comprises:
sending, by the third access network device, a third request to a first device, wherein the third request is used to request the first identifier of the target terminal device, and the third request comprises the second correlation information; and
receiving, by the third access network device, the first identifier of the target terminal device from the first device.

17. The method according to claim 15, wherein the determining, by the third access network device, the data analysis result of the target terminal device based on the second correlation information and the target model comprises:
determining, by the third access network device, inference data of the target terminal device based on the second correlation information, wherein the inference data comprises the fourth data of the target terminal device on the first access network device; and
determining, by the third access network device, the data analysis result of the target terminal device based on the inference data of the target terminal device and the target model.

18. The method according to claim 13, wherein the second correlation information comprises one or more of the following information: time information, an identifier allocated by the first access network device to the terminal device, and an identifier of the first access network device.

19. A communication apparatus, comprising:
a memory configured to store program instructions; and
a processor configured to execute the program instructions to cause the apparatus to:
obtain first data of a terminal device on a second device, wherein the first data comprises first correlation information, the first correlation information is used to correlate the first data with second data of the terminal device on a first access network device, the second data comprises the first correlation information, and there are one or more terminal devices;
determine a first identifier of the terminal device; and
send the first correlation information and the first identifier of the terminal device to a second access network device.

* * * * *